United States Patent
Katou et al.

(10) Patent No.: US 6,491,604 B1
(45) Date of Patent: Dec. 10, 2002

(54) METHOD OF CONTROLLING HYDRAULIC PRESSURE IN SPEED CHANGE MECHANISM HAVING HYDRAULIC CLUTCH

(75) Inventors: Katsunori Katou, Hyogo (JP); Mizuya Matsufuji, Hyogo (JP)

(73) Assignees: Yanmar Diesel Engine Co., Ltd., Osaka (JP); Kanzaki Koyukoki Mfg. Co., Ltd., Hyogo (JP)

( * ) Notice: Subject to any disclaimer, the term of this patent is extended or adjusted under 35 U.S.C. 154(b) by 0 days.

(21) Appl. No.: 09/831,955

(22) PCT Filed: Nov. 11, 1999

(86) PCT No.: PCT/JP99/06307

§ 371 (c)(1),
(2), (4) Date: May 16, 2001

(87) PCT Pub. No.: WO00/29765

PCT Pub. Date: May 25, 2000

(30) Foreign Application Priority Data

Nov. 16, 1998 (JP) .......................... 10/342344
Jan. 12, 1999 (JP) .......................... 11/005200

(51) Int. Cl.⁷ ............................................. F16H 61/04
(52) U.S. Cl. .................................................. 477/154
(58) Field of Search ................... 477/115, 116, 477/117, 143, 151, 154, 169

(56) References Cited

U.S. PATENT DOCUMENTS

| | | | |
|---|---|---|---|
| 3,747,439 A | | 7/1973 | Uozumi et al. |
| 4,790,418 A | * | 12/1988 | Brown et al. .......... 74/752 Z X |
| 5,046,383 A | * | 9/1991 | Butts et al. .................... 74/862 |
| 5,403,248 A | * | 4/1995 | Ando et al. .................. 477/130 |
| 5,460,583 A | * | 10/1995 | Kitdada et al. ............. 477/154 |
| 5,467,854 A | | 11/1995 | Creger et al. |
| 5,634,869 A | * | 6/1997 | Mikami et al. ............. 477/154 |
| 5,674,151 A | * | 10/1997 | de Schepper et al. ... 477/154 X |
| 5,778,329 A | * | 7/1998 | Officer et al. ........... 477/151 X |
| 5,782,711 A | * | 7/1998 | Tsutsui et al. .......... 477/143 X |
| 5,846,163 A | * | 12/1998 | Kimura et al. .......... 477/143 X |
| 5,871,418 A | * | 2/1999 | Kimura et al. .......... 477/143 X |
| 6,149,547 A | * | 11/2000 | Oba et al. ................... 477/154 |
| 6,159,129 A | * | 12/2000 | Holbrook et al. ....... 477/143 X |
| 6,319,172 B1 | * | 11/2001 | Steinmetz et al. .......... 477/143 |

FOREIGN PATENT DOCUMENTS

| | | |
|---|---|---|
| JP | 49-36903 | 10/1974 |
| JP | 62-209256 | 9/1987 |
| JP | 8-20258 | 1/1996 |
| JP | 8-68458 | 3/1996 |

* cited by examiner

*Primary Examiner*—Charles A Marmor
*Assistant Examiner*—Roger Pang
(74) *Attorney, Agent, or Firm*—Sterne, Kessler, Goldstein & Fox P.L.L.C.

(57) ABSTRACT

A speed change mechanism (1) constructed by connecting in tandem a hydraulic type speed change unit (17) having a plurality of hydraulic clutches (57, 58, 59) to be alternatively engaged and a hydraulic type speed change unit (20) having a plurality of hydraulic clutches (66, 67, 68) to be alternatively engaged, wherein a time-varying region (common slip region) is secured in which the two clutches slip in common such that during speed change, when the working hydraulic pressure in a clutch to be engaged is on its way to gradual increase, the working hydraulic pressure in a clutch to be disengaged lowers. This common slip region is made smaller during shift-down than during shift-up by a change in time-difference between the pressure increase start time for the clutch to be engaged and the pressure decrease start time for the clutch to be disengaged or by a change in the pressure decrease property of the clutch to be disengaged, and is maintained constant irrespective of whether one or two hydraulic clutches are engaged and disengaged during speed change respectively or irrespective of a difference in engine rpm.

15 Claims, 26 Drawing Sheets

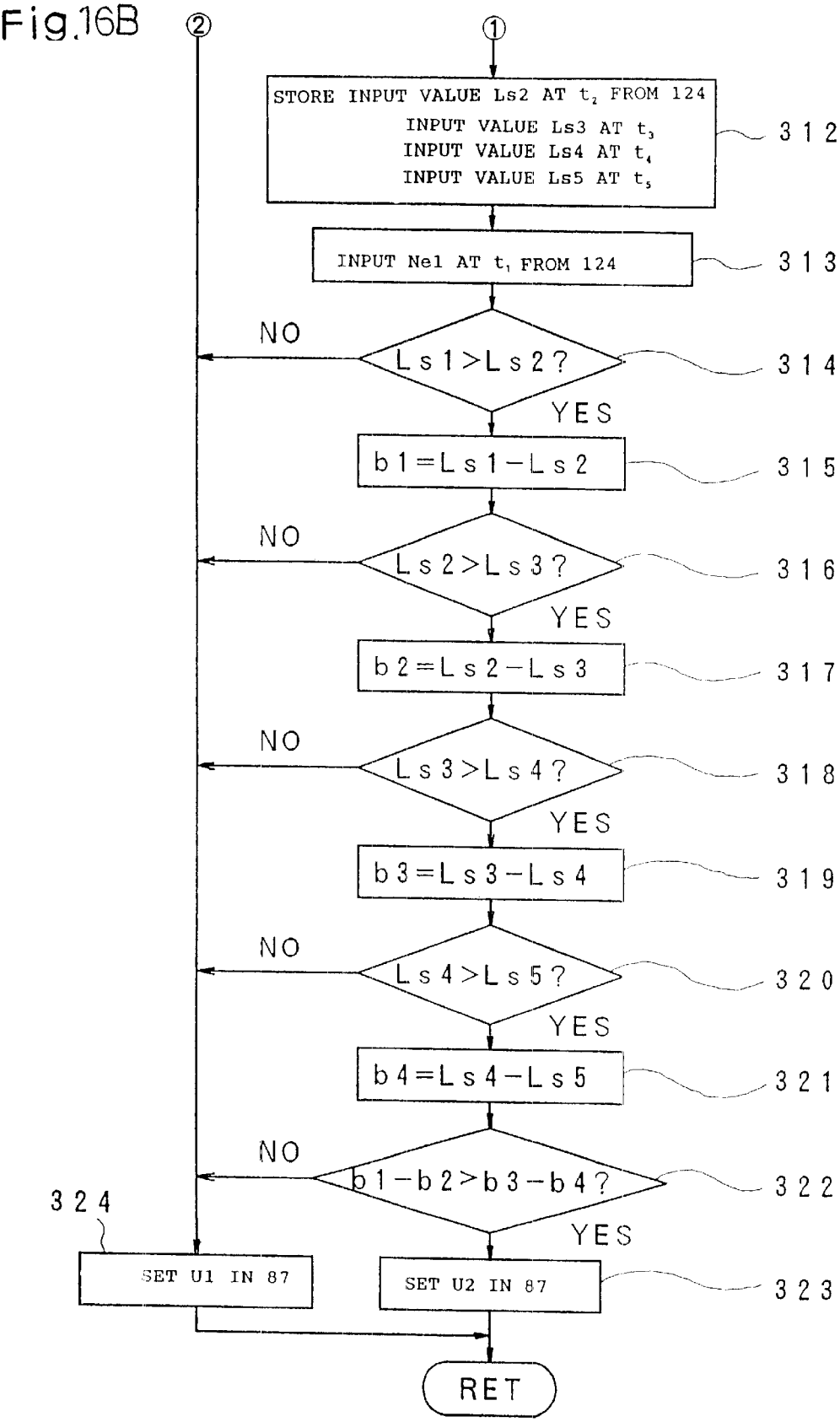

METHOD OF CONTROLLING HYDRAULIC PRESSURE IN SPEED CHANGE MECHANISM HAVING HYDRAULIC CLUTCH

TECHNICAL FIELD

The present invention relates to a method of controlling hydraulic pressures in a speed changing mechanism having a plurality of hydraulic clutches, that is, a hydraulic power shift speed change mechanism. Particularly, the invention relates to a method of controlling hydraulic pressures in a multistep-speed-type speed change mechanism constituted such that a plurality of hydraulic type speed change units are connected in tandem, wherein each of the hydraulic type speed change units is constituted of a plurality of transmission trains, and a hydraulic clutch is provided in each of the transmission trains.

BACKGROUND ART

Conventionally, there is publicly known a so-called hydraulic power shift speed change mechanism configured of a plurality of hydraulic clutches (fluid-operated multidisc clutches). Particularly, there is publicly known a multistep-speed-change-type speed change mechanism constituted such that a plurality of hydraulic type speed change units are connected in tandem, wherein each of the hydraulic type speed change units is constituted of a plurality of transmission trains, and a hydraulic clutch is provided in each of the transmission trains. In vehicles including the speed change mechanism, such as an agricultural and other work tractors, speed-changing for the number of steps obtained by multiplying the numbers of transmission trains provided in individual speed change units. Suppose a speed change mechanism configured of two hydraulic type speed change units, in which two transmission trains are provided in one of the hydraulic type speed change units, and three transmission trains are provided in the other hydraulic type speed change unit. In this case, 2×3 steps are obtained; that is, totally, six-step speed changes can be performed.

Conventionally, to perform input/output control for engagement/disengagement operating fluid for individual hydraulic clutches in the above-described speed change mechanism, electromagnetic-type selector valves are used.

In connection with the conventional hydraulic-pressure control for the hydraulic clutches at the time of speed-changing, first of all, the relationship in time between engagement-objective clutches and disengagement-objective clutches will be described below. Essential things regarding speed-changing include the prevention from a case where double transmission trains are operated to be in transmission states. Specifically, in the above-described multistep-speed-change-type speed change mechanism configured by combining the plurality of hydraulic type speed change units, it is essential to avoid a case where two clutches are operated in an engaged state in each of the speed change units. Therefore, conventionally, a disengagement-objective clutch is first disengaged substantially completely; and after a nontransmission state is once made in the speed change mechanism, the engagement of the engagement-objective clutch is then started. However, a high load is imposed during a nontransmission state, the vehicle is likely stopped. In addition, since a hydraulic pressure begins to rise from the nontransmission state when the engagement-objective clutch starts engagement, there remain problems which cannot be solved in that great shocks occur, thereby causing an operator to feel uncomfortable.

In view of the above, as described below in the "Disclosure of Invention" and in other portions, even when the transmission efficiency is reduced to the lowest level during speed-changing, at least either the disengagement-objective clutches or the engagement-objective clutches are controlled to be in slip states. Specifically, operating timing and a time-transitional hydraulic pressure property for the individual disengagement-objective clutch and the individual engagement-objective clutch are set so that a region representing a slip state (the region will hereinbelow be referred to as a "common slip region") for the two clutches can be secured.

Hereinbelow, a brief description will be made regarding clutch hydraulic pressures in the slip state. The pressure for a disengaged clutch in a fluid chamber is substantially 0, and a piston for operating a clutch disc is in a free state. To engage the disengaged clutch, first, fluid is fed to a fluid chamber therefor to be filled out, and the filled out fluid must be used to increase the pressure to hold the piston. When a hydraulic pressure having a value that is sufficiently high to hold at least the piston is set to a piston-holding pressure, the hydraulic piston is brought to a slip state at an operating hydraulic pressure that is higher than the piston-holding pressure.

However, different from the above-described conventional hydraulic-pressure control for which the relationship between the individual hydraulic pressure states for the disengagement-objective clutch and the engagement-objective clutch need not be taken into account, in the hydraulic-pressure control of the present invention, when the individual time-transitional hydraulic pressure properties for the engagement-objective clutch and the disengagement-objective clutch are fixed as have been set under specific conditions where, for example, the engine is operated at a rated revolution frequency, there occurs cases wherein no common slip region can be secured because of the conditional variations.

For example, in a speed change mechanism configured of two hydraulic type speed change units, there are two speed-changes. One of the speed changes is performed such that in one of the hydraulic type speed change units, clutches remain held in engaged states; and in the other hydraulic type speed change unit, one engaged clutch is disengaged, and a different clutch is newly engaged (one-objective-based hydraulic clutches are disengaged/engaged). The other speed change is performed such that, in each of the hydraulic type speed change units, one engaged clutch is disengaged, and a different clutch is newly engaged; that is, in the overall speed change mechanism, totally, two clutches are disengaged, and two clutches are engaged (two-objective-based hydraulic clutches are disengaged/engaged). As described above, before an engagement-objective clutch is controlled to be in a slip state, wait time is required until the pressure increases up to the level of the piston-holding pressure after the fluid is injected into the fluid chamber of the clutch. For two-objective-based hydraulic clutches to be disengaged/engaged, aforementioned time is required substantially twice as much as that in the case where one-objective-based hydraulic clutches are disengaged/engaged. Therefore, when clutch-timing and a time-transitional hydraulic pressure property are set to secure a common slip region according to the case where the one-objective-based hydraulic clutches are disengaged/engaged, they are not suitable to the case where the two-objective-based hydraulic clutches are disengaged/engaged.

When the engine revolution frequency is reduced, time required for filling out the fluid in the clutch fluid chamber is increased. Therefore, for example, hydraulic-pressure control is set to obtain a common slip region during a rated revolution. However, problems similar to the above can arise during idle revolution.

In comparison between a speed-changing operation at a shifting-up time and a speed-changing operation at a shifting-down time, in the former case, since the relative revolution speed of a secondary-side rotation shaft with respect to that on a primary side of an engaged/disengaged is increased, a common-slip-region period needs to be set to be relatively long. On the other hand, in the latter case, the speed-changing is performed to reduce the relative revolution speed of the same secondary-side rotation shaft, and rotational inertia at a time of preshift operation is imposed on the secondary-side rotation shaft. Therefore, the common-slip-region period may be short; and when it is long, smooth speed-changing is impaired.

As in the conventional case, in speed-changing in which an engagement-objective clutch is engaged after a disengagement-objective clutch is disengaged, detection is performed by using a pressure sensor or the like for the state of engagement of the disengagement-objective clutch that is supposed to have been engaged. Checking is thereby performed for abnormality (such as entrance of foreign substances). Thereafter, engagement of the engagement-objective clutch is interrupted, thereby allowing double transmission to be avoided. As in the case of the present invention, in the speed-changing in which a common slip region is secured, disengaging operations and engaging operations of clutches are overlapped. Therefore, there can be caused a case where a disengagement-objective clutch is not disengaged, while an engagement-objective clutch is engaged. That is, there can be caused double transmission that can cause damage in the transmission mechanism. Therefore, an abnormality-detecting method suitable to the present invention is demanded.

Pressure-increase properties required for the engagement-objective clutches at the time of speed-changing are different depending on the traveling mode of a work vehicle employing the speed change mechanism; that is, the properties differ depending on whether the vehicle is engaged in normal (on-the-road) traveling or tractional traveling. In a tractional travel time, the hydraulic pressure at a rising time needs to be set high, and the clutch needs to be quickly engaged. Otherwise, the transmission efficiency is not sufficient to catch up with the load, thereby causing engine failure. To reduce shock that can be caused in a normal travel time, rising pressure is preferably controlled as low as possible.

Conventionally, to overcome these problems, in a hydraulic-pressure control system for hydraulic clutches, two types of pressure-increase properties, one for normal traveling and another for tractional traveling so as to be alternatively selected by an operator are stored.

However, problems still remain pending resolution. With a control method that is dependent on operator's switching operation, when erroneous operation is performed, there occurs hydraulic-pressure increase that does not correspond to practical requirements, causing problems such as engine failure and shock generation. To cope with these problems, the control is preferably arranged such that the load state is automatically can be detected, and one of the hydraulic-pressure-increase properties can be selected according to the result of the detection.

In addition, as described above, the variety of conditions varies the requirements regarding, for example, hydraulic-clutch engagement/disengagement operations at the time of speed-changing, i.e., the time-transitional hydraulic-pressure-increase properties for engagement-objective clutches, time-transitional hydraulic-pressure-decrease properties, and the operational timing. To comply with these requirements, it is preferable that input/output hydraulic pressures for clutches be controlled to be variable; that is, it is preferable that the capacity of an individual clutch-operating valve be variable.

DISCLOSURE OF THE INVENTION

The present invention relates to a speed change mechanism (so-called hydraulic power shift speed change mechanism) having a plurality of speed-changing hydraulic clutches, each of which is engaged according to hydraulic-pressure-increase effects and is disengaged according to hydraulic-pressure-decrease effects. A primary object of the invention is to avoid a nontransmission state that can occur at a time of speed-changing with the speed change mechanism.

To achieve the object, according to the present invention, at a time of speed-changing operation, an operating hydraulic pressure for a clutch to be engaged from a disengaged state is gradually increased in a time transition, and an operating hydraulic pressure for the clutch to be disengaged from an engaged state is reduced during the gradual pressure increase. Preferably, during the speed-changing operation, an operating-hydraulic-pressure-decrease start time for the disengagement-objective clutch is set to be later than an operating-hydraulic-pressure-increase start time at which a fluid chamber of the engagement-objective clutch becomes full of fluid, and the pressure thereof rises to a piston-holding pressure. Thereby, a time-transitional pressure region (common slip region) where an engagement-objective clutch and a disengagement-objective clutch commonly slip at the time of speed-changing operation is secured.

Also, in connection with the aforementioned object, in order to allow the common slip region to be constantly secured at all times regardless of various conditional variations, at least one of a time difference between the operating-hydraulic-pressure-increase start time for the engagement-objective clutch and the operating-hydraulic-pressure-decrease start time for the disengagement-objective clutch and a time-transitional decrease property in the operating pressure for the disengagement-objective clutch is controlled to vary corresponding to engine revolution frequencies.

In this case, the various conditions include engine revolution frequency. Corresponding to the property that a fluid-chamber filling-out time for the engagement-objective clutch increases in proportion to reduction in the engine revolution frequency, when the time difference is controlled to vary, the aforementioned time difference is set longer in proportion to reduction in the engine revolution frequency or in a case where the engine revolution frequency is equal to or lower than a specific level so as to decrease slower in proportion to reduction in the engine revolution frequency or in a case where the engine revolution frequency is equal to or lower than a specific level.

In the speed change mechanism (so-called multistep-speed-change-type speed change mechanism) configured by classifying the aforementioned plurality of speed-changing hydraulic clutches to allocate them to a plurality of hydraulic type speed change units, the hydraulic clutches are alternatively engaged in each of the hydraulic type speed change unit to thereby form one speed step. In this configuration, as described above, in order to secure the time-transitional pressure region (common slip region) where the engagement-objective clutch and the disengagement-objective clutch at the time of speed-changing commonly slip, when the hydraulic-pressure control in which the operating hydraulic pressure for the clutch to be engaged from a disengaged state is gradually increased in the time transition, and an operating hydraulic pressure for the clutch to be disengaged from an engaged state is reduced during the gradual pressure increase at the time of speed-changing is employed, the number of clutches to be engaged/disengaged is included as one of the aforementioned various conditions. Therefore, when the time difference is controlled to vary, the time difference is set relatively long at a time of speed-changing when the number of the clutches to be engaged/disengaged is large, and the time-transitional decrease property is controlled to vary, the time-transitional decrease property is set to be reduced slower at a time of speed-changing when the number of the clutches to be engaged/disengaged is large.

Considering that a rotational inertia is imposed at a time of shifting-down operation compared to a case at a time of the shifting-up operation, in order to reduce the area of a common slip region at the time of the shifting-down operation to be narrower than that at the time of shifting-up operation, at least one of a time difference between the operating-hydraulic-pressure-increase start time for the engagement-objective clutch and the operating-hydraulic-pressure-decrease start time for the disengagement-objective clutch and a time-transitional decrease property in the operating pressure for the disengagement-objective clutch is controlled to vary depending on whether the speed-changing operation is a shifting-up operation or a shifting-down operation. For example, the time difference is set to be relatively short.

In this case, it is preferable that, during speed-changing, regardless of variations in the time difference and the time-transitional decrease property that have been set to meet the aforementioned individual conditions, the operating-hydraulic-pressure-decrease start time for the disengagement-objective clutch be set to be later than the operating-hydraulic-pressure-increase start time at which the fluid chamber of the engagement-objective clutch becomes full of fluid, and the pressure thereof rises to the piston-holding pressure.

Another object of the present invention is to provide an appropriate method to detect an abnormal clutch to prevent the occurrence of a double-transmission state in the hydraulic power shift speed change mechanism for which the hydraulic-pressure control is performed as described above.

To achieve this object, a pressure-detecting means is provided to detect an operating hydraulic pressure for each of the hydraulic clutches, and when the number of the pressure-detecting means for detecting hydraulic pressures higher than a specific pressure value is greater than the number of the hydraulic clutches to be engaged at the time of speed-changing operation (in the speed change unit configured of the plurality of hydraulic type speed change units that are connected to in tandem, when two or more units of the detecting means each detect a pressure higher than a specific pressure value in at least in one of the hydraulic type speed change units), one of two hydraulic-pressure control operations is performed, one hydraulic-pressure control operation being performed to engage only those of the hydraulic clutches which have immediate-previously been disengaged, and the other one hydraulic-pressure control operation being performed to disengage all the hydraulic clutches.

The individual pressure-detecting means may be configured such that the individual means constitute switches each turning ON or OFF with respect to the border of the specific pressure value, and when the number of the pressure-detecting means for detecting hydraulic pressures higher than a specific pressure value is greater than the number of the hydraulic clutches to be engaged at the time of speed-changing operation (in the speed change unit configured of the plurality of hydraulic type speed change units that are connected to in tandem, when two or more units of the detecting means each detect a pressure higher than a specific pressure value in at least in one of the hydraulic type speed change units), one of two hydraulic-pressure control operations is performed, one hydraulic-pressure control operation being performed to engage only those of the hydraulic clutches which have immediate-previously been disengaged, and the other one hydraulic-pressure control operation being performed to disengage all the hydraulic clutches.

Still another object of the present invention is to detect whether a load is imposed on a vehicle by using appropriate detecting means, not by relying on operator-performing switch operations. This allows operating hydraulic pressures for the individual hydraulic clutches to be appropriately increased without failure.

To achieve this object, in the present invention tractional-load detecting means is provided in a vehicle employing the speed change mechanism to thereby modify a time-transitional increase property in the operating pressure for the hydraulic clutch to be engaged at the time of speed-changing and a time-transitional decrease property in the operating pressure for the hydraulic clutch to be disengaged at the time of speed-changing depending on whether or not the tractional-load detecting means detects a tractional load. Alternatively, when a governor mechanism capable of performing control of an engine revolution frequency according to detection of an engine load is provided in the vehicle employing the speed change mechanism, the governor is used to modify a time-transitional increase property in the operating pressure for the hydraulic clutch to be engaged at the time of speed-changing depending on whether or not the governor mechanism detects an engine load equal to or higher than a specific level.

The above load detection may be used to modify a time-transitional decrease property in the operating pressure for the hydraulic clutch to be disengaged at the time of speed-changing.

As summarized above, the speed change mechanism comprising hydraulic clutch according to the present invention, corresponding to the various conditions modifies the time difference between the operating-hydraulic-pressure-increase start time for the engagement-objective clutch, the operating-hydraulic-pressure-decrease start time for the disengagement-objective clutch, and the time-transitional decrease property in the operating pressure for the disengagement-objective clutch at the time of speed-changing operation. Therefore, in order to allow input/output pressures of operating fluid fed to each of the hydraulic clutches to be adjustable, the individual hydraulic clutch is controlled by means of an electromagnetic pressure proportion valve provided for each of the hydraulic clutches.

The above and other objects, configurations, and advantages of the invention will become apparent from the following detailed description thereof taken in conjugation with the accompanying drawings.

BRIEF DESCRIPTION OF THE DRAWINGS

FIGS. 16A and 16B show a flowchart of the pressure-increase-property determination using an electronic governor;

BEST MODE FOR CARRYING OUT THE INVENTION

Figure 1:
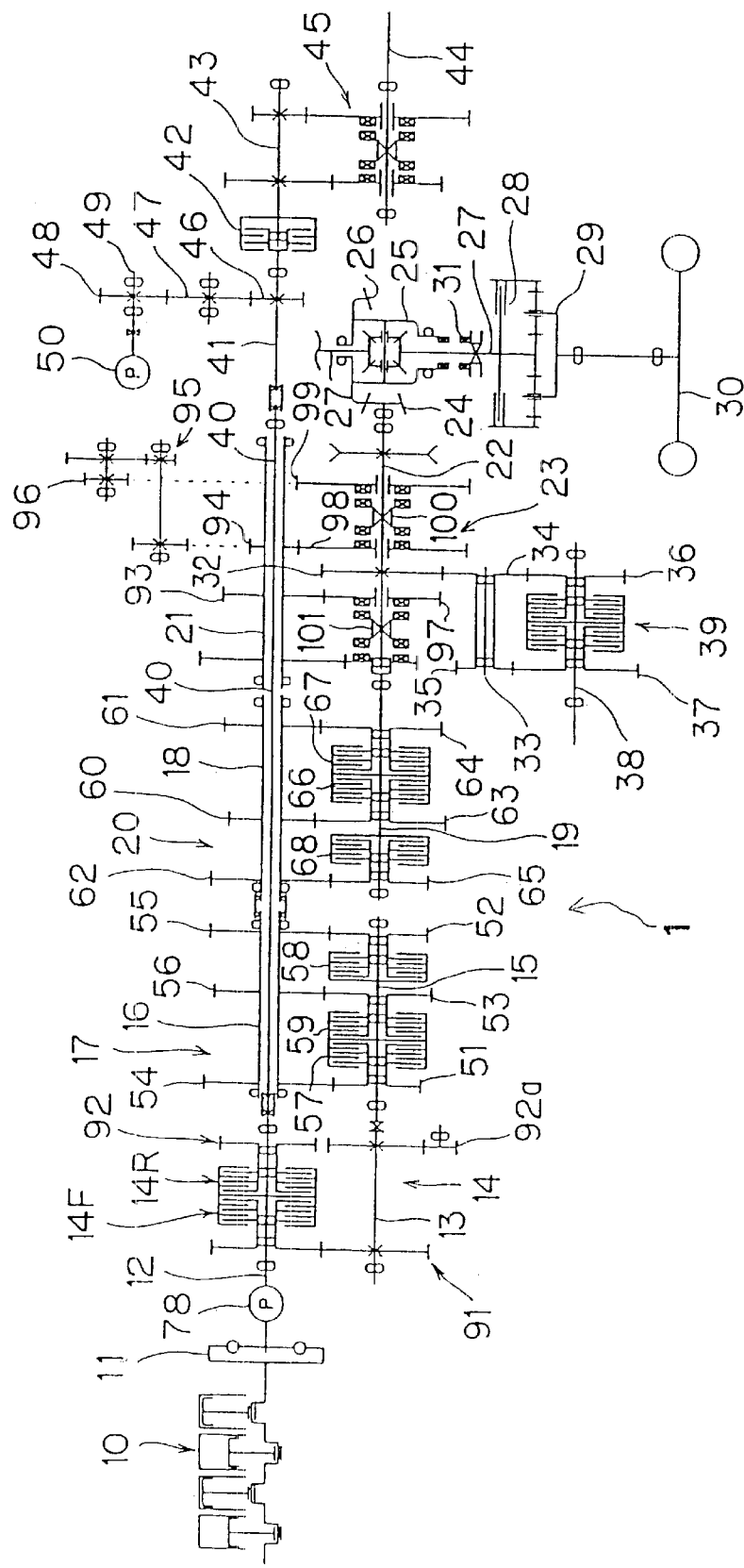
FIG. 1 is a skeletal view of a tractor transmission system having a nine-step-variable-speed-type hydraulic primary speed change mechanism 1.
Figure 7:
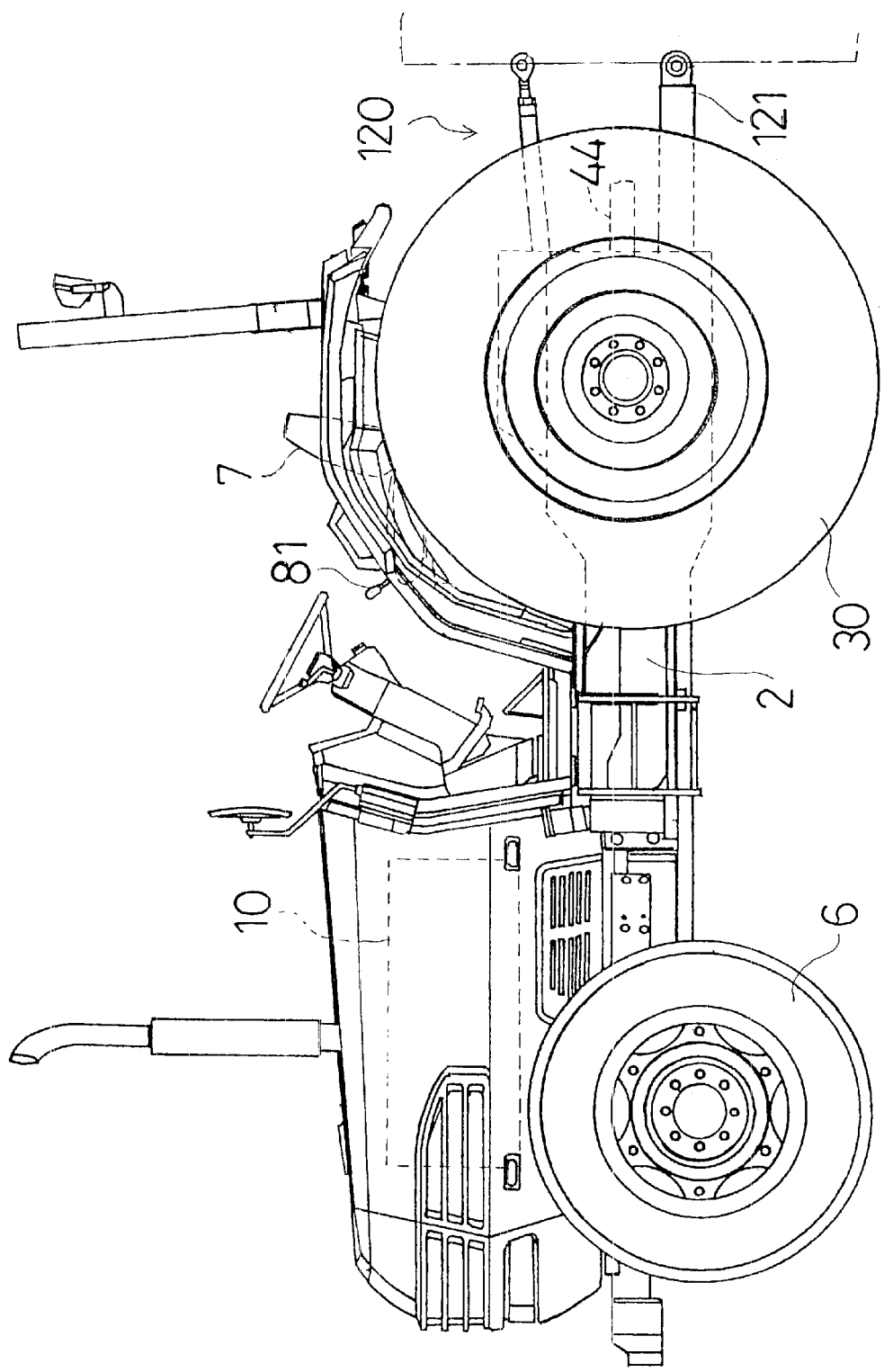
FIG. 7 is a side view of a tractor employing the electrical controller system shown in FIG. 4.

FIG. 1 shows a transmission system used for a work vehicle (tractor) that has a nine-step-variable-speed-type speed change mechanism (a so-called hydraulic power shift speed change mechanism) including hydraulic clutches as a primary speed change mechanism. The transmission system is configured such that a travel transmission system and a PTO transmission system are separated from an engine shaft 12 connected through a buffering coupler 11 to an engine 10 disposed on a foremost portion of the vehicle as shown in FIG. 7. The transmission system is housed in a transmission housing 2 shown in FIG. 7.

Hereinbelow, the transmission system shown in FIG. 1 will be described; and first, the travel transmission system will be described. A hydraulic reverser unit 14 is disposed between a reverser output shaft 13, which is disposed parallel to the engine shaft 12, and the engine shaft 12. A first drive shaft 15 is disposed along an extending line of the reverser output shaft 13, and is integrally connected to the reverser output shaft 13. A tube-type first speed change shaft 16 is disposed on an extending line of the engine shaft 12. A first hydraulic type speed change unit 17 is provided between the first drive shaft 15 and a first speed change shaft 16. A tube-type second drive shaft 18 is disposed along an extending line of the first speed change shaft 16. A second speed change shaft 19 is disposed along an extending line, of the first drive shaft 15. A second hydraulic type speed change unit 20 is provided between the second drive shaft 18 and the second speed change shaft 19. A propeller shaft 22 is disposed on extending line of the second speed change shaft 19. A mechanical speed change mechanism 23 is disposed as a secondary speed change mechanism between the second speed change shaft 19 and the propeller shaft 22. A small bevel gear 24 engages a large input bevel gear 26 of a left/right rear-wheel differential mechanism 25. A differential output shaft 27 on the left/right of the differential mechanism 25 is connected to a left/right rear wheel 30 shown in FIG. 8 through a left/right brake 28 and final speed-reduction device 29 of a planetary gear type. A diff-lock clutch 31 is provided on one of the differential output shafts 27.

In the travel transmission system, the primary speed change mechanism 1 is constituted by combining the first hydraulic type speed change unit 17 and the second hydraulic type speed change unit 20. However, before it is described, the hydraulic reverser unit 14 and the speed change mechanism 23 will hereinbelow be described in detail.

In the hydraulic reverser unit 14, a forward gear train 91 and a backward gear train 92 including an idle gear 92a are provided between the engine shaft 12 and the reverser output shaft 13. In the individual gear trains 91 and 92, gears are disposed to be idle on the engine shaft 12. One of these gears on the engine shaft 12 is connected to the engine shaft 12 by alternative connection through one of a forward hydraulic clutch 14F and a backward hydraulic clutch 14R. Thereby, the forward or backward rotation is selectively transmitted to the reverser output shaft 13.

The speed change mechanism 23 allows a countershaft 21 to be connected to the second speed change shaft 19 via a reduction gear train. Two speed change gears 93 and 94 are immobilized on the countershaft 21. Via a reduction gear mechanism 95, the speed change gear 94 on a smaller diameter side of the shaft is connected to a speed change gear 96 disposed outside of the countershaft 21. On the other hand, on the propeller shaft 22, gears 97, 98, and 99 are provided to be idle, and in addition, two dual-type clutches 100 function to selectively connect one of the gears 98 and 99 to the propeller shaft 22. The dual-type clutch 101 provides one of two selectable connections, one of the connections connects the gear 97 to the propeller shaft 22, and the other connection directly connects the second speed change shaft 19 and the propeller shaft 22 together. As described above, four-step speed change can be implemented according to the mechanical speed change mechanism that functions as the secondary speed change mechanism.

Figure 8:
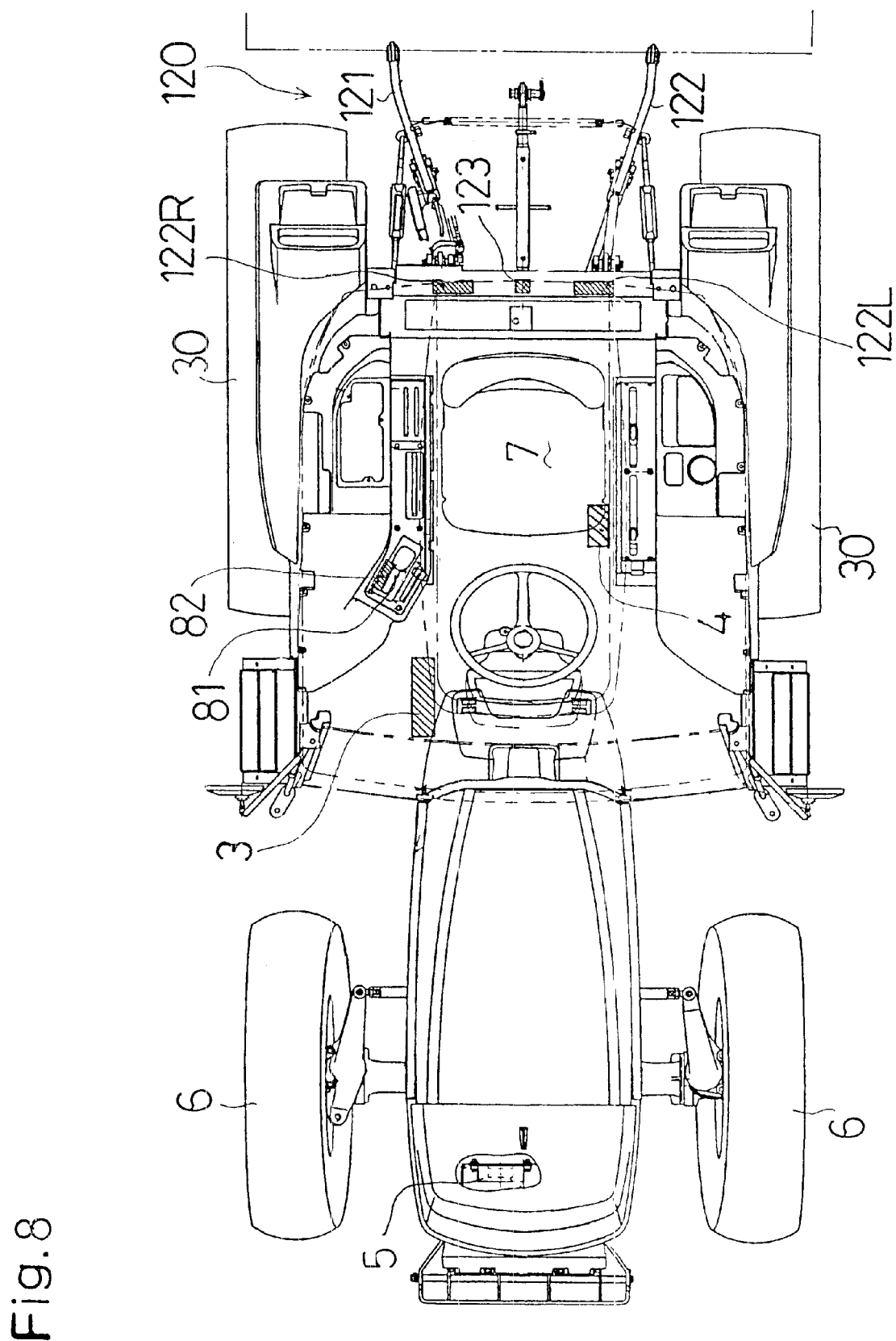
FIG. 8 is a plan view of the aforementioned tractor.

The aforementioned tractor can travel either by two-wheel driving of the left and right rear wheels 30 to which power is transmitted through the travel transmission system or by four-wheel driving in which left and right front wheels 6 shown in FIG. 8 are also selectively driven. In a transmission system for the front-wheel driving power, two gears 34 and 35 are idly provided on a countershaft 33 to be integrally and relatively rotatable thereon. A gear 32 immobilized on the propeller shaft 22 engages the gear 34; and gears 36 and 37 engage the gears 34 and 35, respectively. Between the gears 36 and 37 and a driving-power taking off shaft 38, a hydraulic clutch unit 39 is provided to selectively connect one of the gears 36 and 37 to the driving-power-taking-off shaft 38. When the gear 37 is connected to the driving-power-taking-off shaft 38, the front wheels 6 and the rear wheel 30 rotate at a synchronizing speed. Also, when the gear 36 is connected thereto, the front wheels 6 rotate at a speed higher that of the rear wheels 30.

Hereinbelow, the PTO transmission system will be described. A transmission shaft 40 extends from the rear end of the engine shaft 12, passing through the tubular-type first speed change shaft 16, second drive shaft 18, and countershaft 21. A transmission shaft 41 extends from the rear end of the transmission shaft 40. A PTO clutch 42 is provided between the transmission shaft 41 and a transmission shaft 43 that is provided on an extending line of the transmission shaft 41. A PTO shaft 44 is disposed parallel to the transmission shaft 43 to extend outside of the mechanism. Inside the mechanism, a mechanical PTO speed change device 45 is provided between the transmission shaft 43 and the PTO shaft 44. Through gears 46, 47, and 48, the transmission shaft 41 transmits power to a power-taking-off shaft 49 to drive a hydraulic pump 50. The hydraulic pump 50 discharges pressurized fluid is used to operate hydraulic clutches of the first hydraulic type speed change unit 17 and the second hydraulic type speed change unit 20. In this case, fluid discharging from the hydraulic pump 50 may be used to vertically move a hydraulic work-machine lifting device provided in a rear portion of the tractor.

Hereinbelow, the primary speed change mechanism 1 in the travel transmission system will be described in detail. In the first hydraulic type speed change unit 17, three gears 51, 52, and 53 are provided to be idle on the first drive shaft 15, and respectively engage three gears 54, 55, and 56 immobilized on the first speed change shaft 16. The respective gears 51, 52, and 53 are alternatively connected to the first drive shaft 15 through three hydraulic clutches 57, 58, and 59 provided on the first drive shaft 15 to thereby allow three-step speed changes to be implemented.

In the first hydraulic type speed change unit 20, three gears 60, 61, and 62 are provided to be idle on the first drive shaft 18, and respectively engage three gears 63, 64, and 65 immobilized on the first speed change shaft 19. The respective gears 63, 54, and 65 are alternatively connected to the first drive shaft 19 through three hydraulic clutches 66, 67, and 68 provided on the first drive shaft 19 to thereby allow three-step speed changes to be implemented.

The primary speed change mechanism 1 is configured to include the first hydraulic type speed change unit 17 and the second hydraulic type speed change unit 20 that are connected together in tandem. When one of the hydraulic clutches 57, 58, and 59 is connected to one of the hydraulic clutches 66, 67, and 68, totally, nine-step speed changes can be obtained.

As shown in Table 1, according to combinations of alternative connections of the hydraulic clutches 57, 58, and 59 and alternative connections of the hydraulic clutches 66, 67, and 68, the first and second hydraulic type speed change units 17 and 20 are set so as to obtain first to ninth speed ratios (output rotation speed/input rotation speed; i.e., the rotation speed of the second speed change shaft 19/rotation speed of the first drive shaft 15)

TABLE 1

| Speed ratios | Hydraulic clutches connected in the first hydraulic type speed change unit 17 | Hydraulic clutches connected in the second hydraulic type speed change unit 20 |
| --- | --- | --- |
| 1st | 57 | 66 |
| 2nd | 58 | 66 |
| 3rd | 59 | 66 |
| 4th | 57 | 67 |
| 5th | 58 | 67 |
| 6th | 59 | 67 |
| 7th | 57 | 68 |
| 8th | 58 | 68 |
| 9th | 59 | 68 |

Hereinbelow, a description will be made regarding a primary speed-changing hydraulic circuit shown in FIG. 2. The circuit is provided for operating the hydraulic clutches 57, 58, and 59 in the first hydraulic type speed change unit 17, and the hydraulic clutches 66, 67, and 68 in the second hydraulic type speed change unit 20. The hydraulic pump 50 shown in FIG. 1 discharges fluid having a hydraulic pressure set by a pressure-controller valve 69 to a fluid-feeder circuit 70.

The fluid-feeder circuit 70 is separated to branch circuits that are connected to the aforementioned six hydraulic clutches 57, 58, 59, 66, 67, and 68. In the individual branch circuits, two-position-method electromagnetic proportion selector valves VL, VM, VH, V1, V2, and V3 are provided. For the convenience of description, a variable aperture Va formed in each of the electromagnetic proportion selector valves is shown outside of each of the electromagnetic proportion selector valves.

Solenoids SL, SM, SH, S1, S2, and S3 of the respective electromagnetic proportion selector valves VL, VM, VH, V1, V2, and V3 are each controlled to an operational position through excitation. They are each controlled to a neutral position when nonexcited. That is, when each of the solenoids is excited, a hydraulic clutch corresponding thereto is controlled to engage; whereas, when it is relieved from excitation, a hydraulic clutch corresponding thereto is controlled to disengage.

Figure 17:
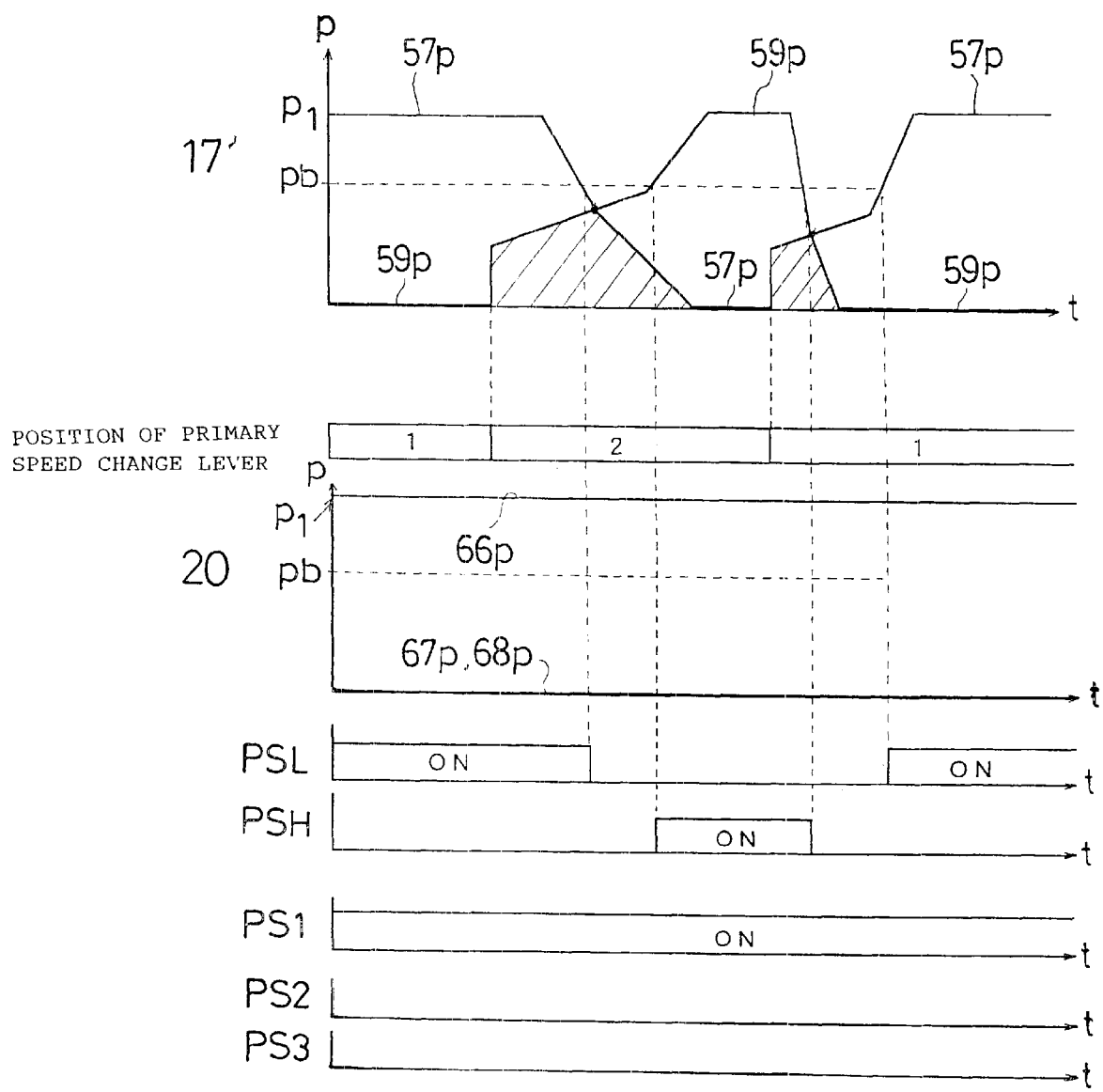
FIG. 17 shows time-transitional graphs regarding input voltages from hydraulic-clutch-operating hydraulic pressures and individual pressure sensors in a first hydraulic type speed change unit 17' and a second hydraulic type speed change unit 20 in the primary speed change mechanism 1', the graph concurrently showing speed changes between a first speed position and a second speed position.
Figure 18:
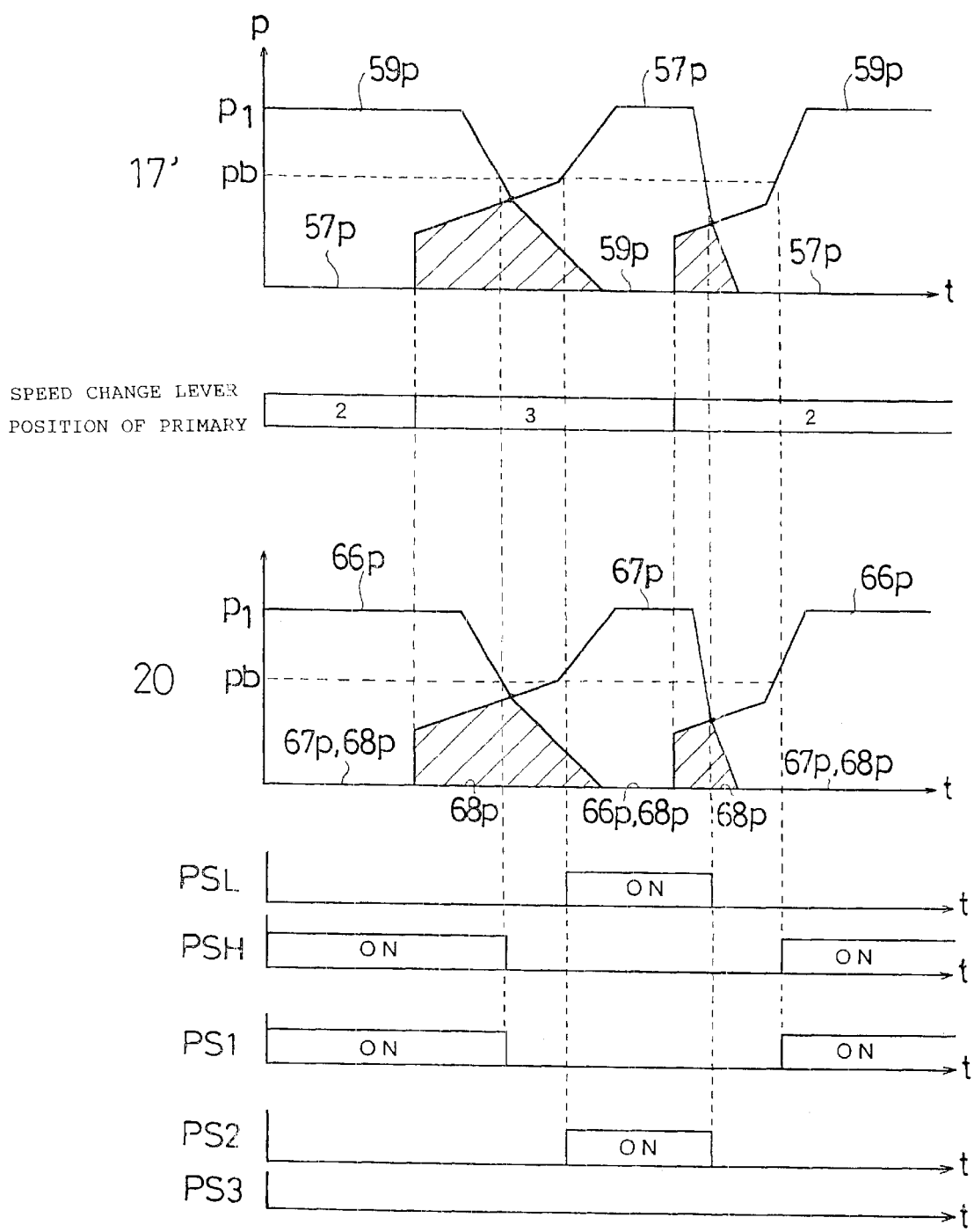
FIG. 18 shows time-transitional graphs, which are similar to the above, regarding speed changes between the second speed position and a third speed position.
Figure 27:
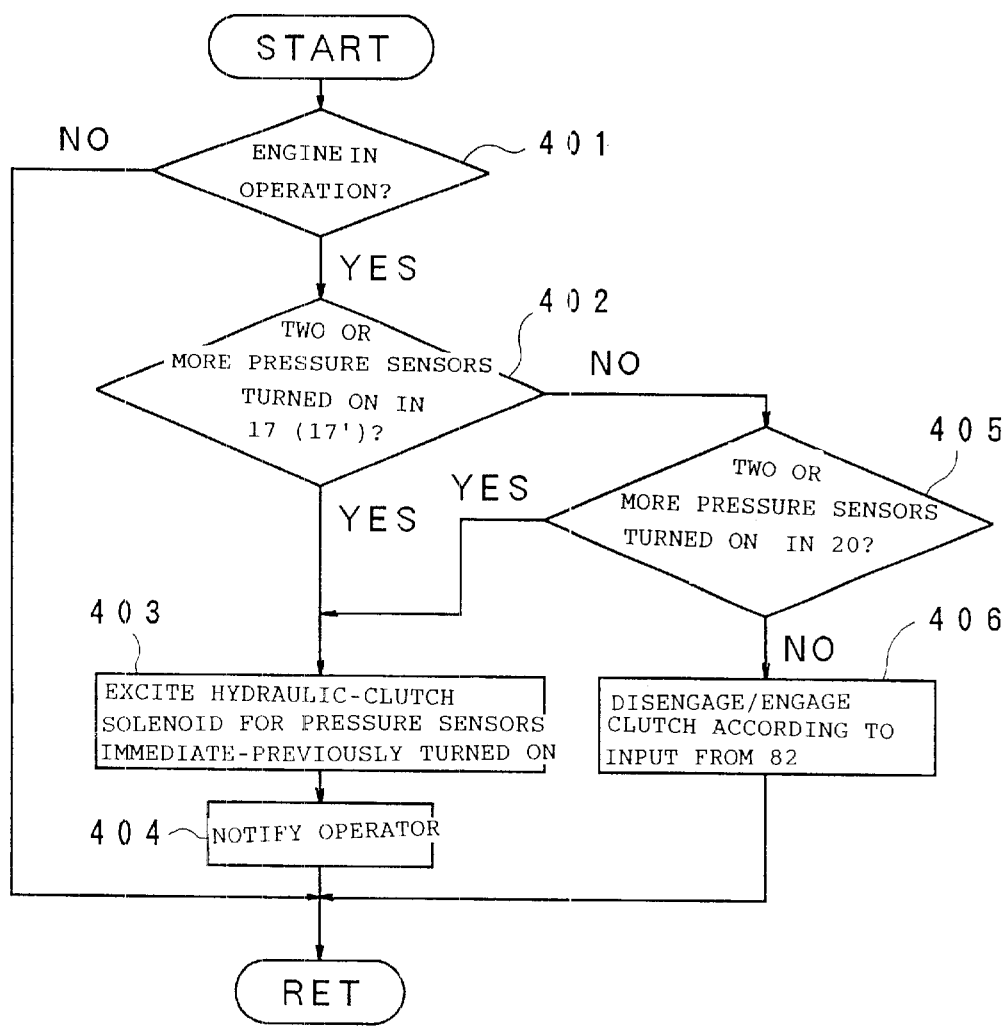
FIG. 27 is a flowchart for detection of an abnormal clutch and for hydraulic-pressure control of the hydraulic clutch according thereto.

Pressure sensors PSL, PSM, PSH, PS1, PS2, and PS3 are connected, respectively, between the electromagnetic proportion selector valves VL, VM, VH, V1, V2, and V3 in the respective branch circuits and the hydraulic clutches 57, 58, 59, 66, 67, and 68. These pressure sensors detecting operating hydraulic pressures may be each connected to a switch that performs ON/OFF operations relative to a predetermined pressure value. Alternatively, the pressure sensor itself may be constructed as the above sensor. Pressure sensors shown in FIGS. 17, 18, and 27 are individually configured as switches that turn ON when a pressure value equal to or greater than a predetermined pressure value (switching pressure pb described below) and that turn OFF when the pressure value is lower than the value. However, they may be configured to turn OFF when the pressure value is lower than the predetermined pressure value and to turn ON when the pressure value is higher than the value.

Figure 9:
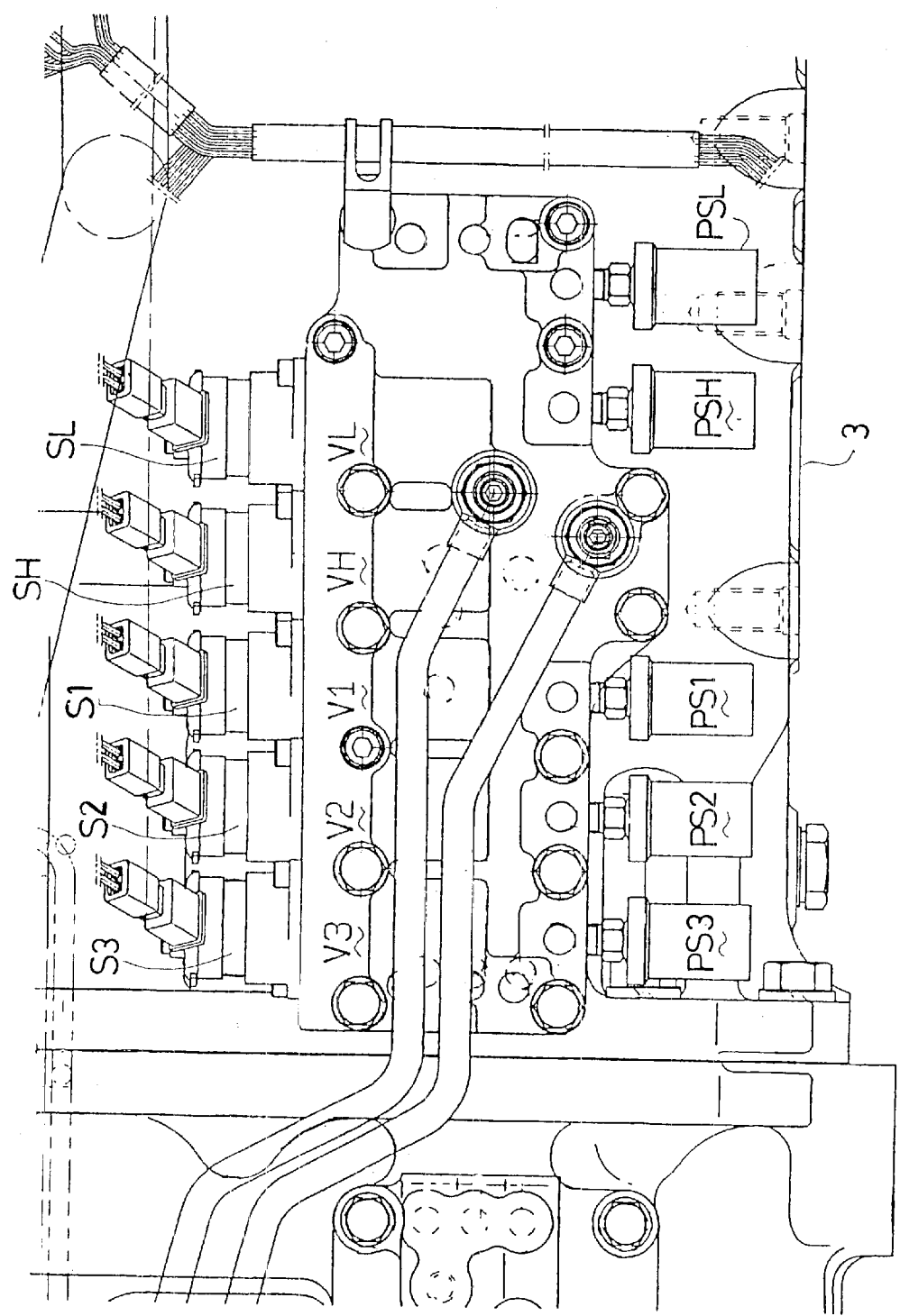
FIG. 9 is a plan view of a primary-speed change hydraulic valve unit 3 for the primary speed change mechanism 1'.

The above-described electromagnetic proportion selector valves and pressure sensors are all stored in the primary-speed-change hydraulic valve unit 3, as shown in FIG. 9. The valve unit 3 is disposed in a part of the tractor, as shown in FIG. 8, and a the valves and sensors are connected to hydraulic-clutches in the transmission housing 2 through pipings. FIG. 9 shows the primary-speed-change hydraulic valve unit 3 that stores electromagnetic proportion selector valves and pressure sensors of the primary speed change mechanism 11, which will be described below. While the primary speed change mechanism 1' will be described below in detail, it is briefed hereinbelow. It is configured by tandem connection of the first hydraulic type speed change unit 17' and the second hydraulic type speed change unit 20. The first hydraulic type speed change unit 17' is configured by eliminating an intermediate-speed clutch 58 from the first hydraulic type speed change unit 17 in the nine-step primary speed change mechanism 1. The second hydraulic type speed change unit 20 is the same as that in the primary speed change mechanism 1. Because of this configuration, the train of the above-described electromagnetic proportion selector valves and the train of the above-described pressure sensors are stored in the primary-speed-change hydraulic valve unit 3 in a state where the electromagnetic proportion selector valve VM (and the solenoid SM) and the pressure sensor PSM are removed.

A description will hereinbelow be made referring to back to the hydraulic circuit diagram in FIG. 2. A lubricant-pressure-setting secondary pressure controller valve 72 is connected to a drain side of a pressure controller valve 69 that branches from the fluid-feeder circuit 70. A lubricant circuit 73 is led from a portion between the two pressure controller valves 69 and 72 to feed lubricant to the hydraulic clutches 57, 58, 59, 66, 67, and 68.

A line filter 76 and a relief valve 77 that functions as a bypass valve are parallel-connected to a fluid-drawing-in circuit 75 that extends from a fluid reservoir 74 up to the hydraulic pump 50. When the line filter 76 is incidentally blinded, the relief valve 77 performs a relief operation to maintain lubricant to flow to the hydraulic pump 50.

A hydraulic pump 78 driven by the engine shaft 12, as shown in FIG. 1 (not shown in FIG. 2), discharges fluid to the two hydraulic clutches 14F and 14R of the above-described hydraulic reverser unit 14. A fluid-drawing-in circuit 79 is provided to connect a fluid-drawing-in side of the hydraulic pump 78 and the fluid-drawing-in circuit 75 to also feed fluid in the fluid reservoir 74 to the hydraulic clutches 14F and 14R.

Figure 3:
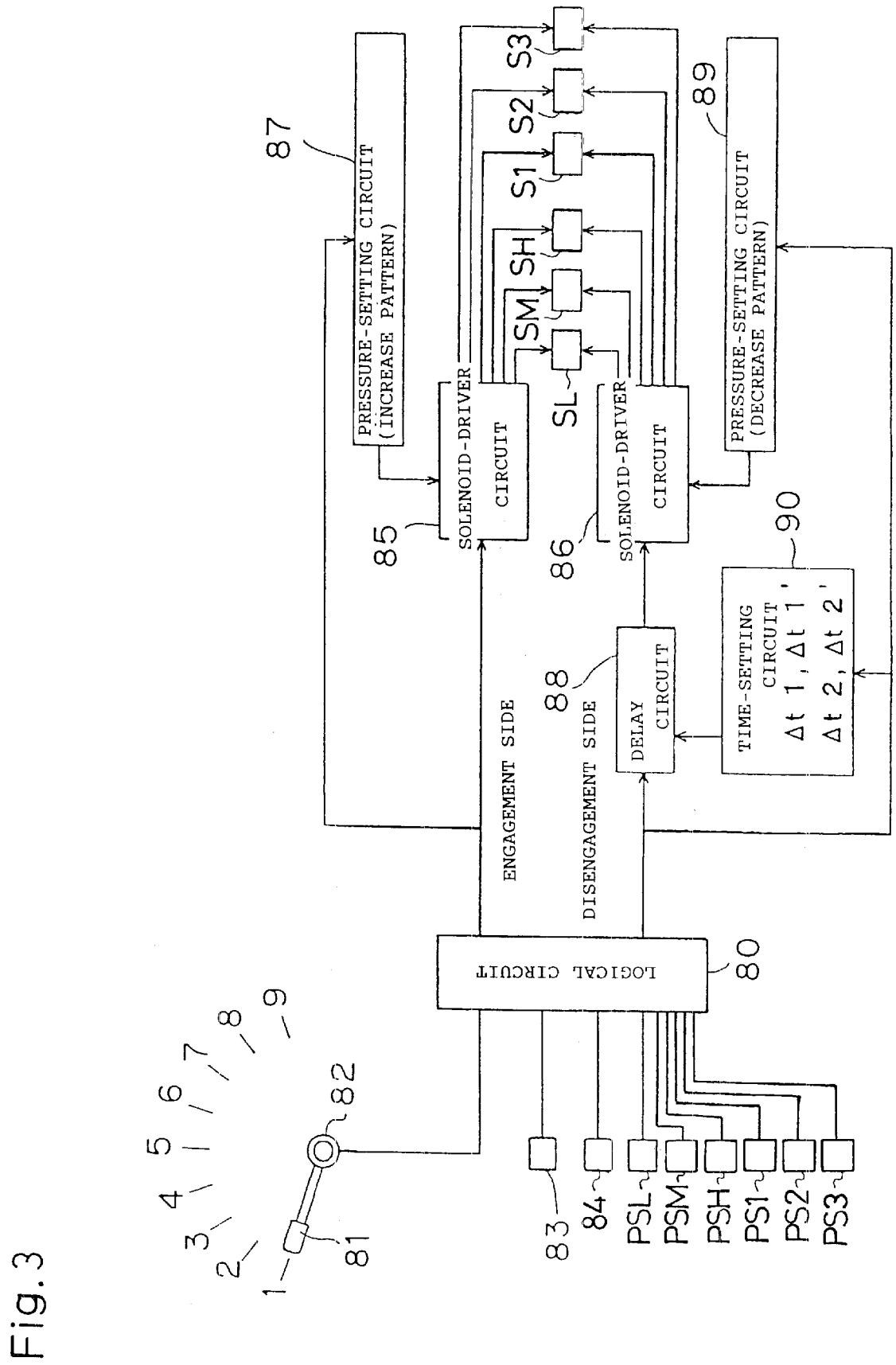
FIG. 3 is a block diagram of an embodiment of an electrical controller circuit in the primary speed change mechanism 1.

Hereinbelow, referring to FIG. 3, a description will be made regarding electrical operation control of the electromagnetic proportion selector valves VL, VM, VH, V1, V2, and V3 for the primary speed change mechanism 1. An input-side interface of a logical circuit 80, as shown in FIG. 8, in a controller 4 disposed in part of the tractor is connected to a potentiometer 82, a tachometer 83, a mode-selector switch 84, and the above-described six pressure sensors PSL, PSM, PSH, PS1, PS2, and PS3. The potentiometer 82 detects the position (lever angle) and the rotational direction of a primary speed change lever 81 disposed near an operator seat 7, as shown in FIGS. 7 and 8. The speeds are set in the range of first to ninth speed positions in the order from lower to higher speeds; and as shown in FIG. 3, numbers 1 to 9 corresponding to the speed positions are indicated in a rotational area of the primary speed change lever 81. The tachometer 83 detects the revolution frequency of the engine 10. The mode-selector switch 84 functions in response to an operation performed by an operator to vary a hydraulic-pressure-increase property that causes the hydraulic clutches in the primary speed change device to engage corresponding to a normal (on-the-road) travel mode and a work traveling mode that is to be carried out at a tractional load. An electronic governor may also be used as a selector switch between two control modes. One of the control modes is carried out to adjust the frequency of the engine revolution to a revolution frequency at the time of normal acceleration operation. The other control mode is carried out to detect engine load ratios, and controls the engine revolution frequency corresponding to the load ratios.

Figure 4:
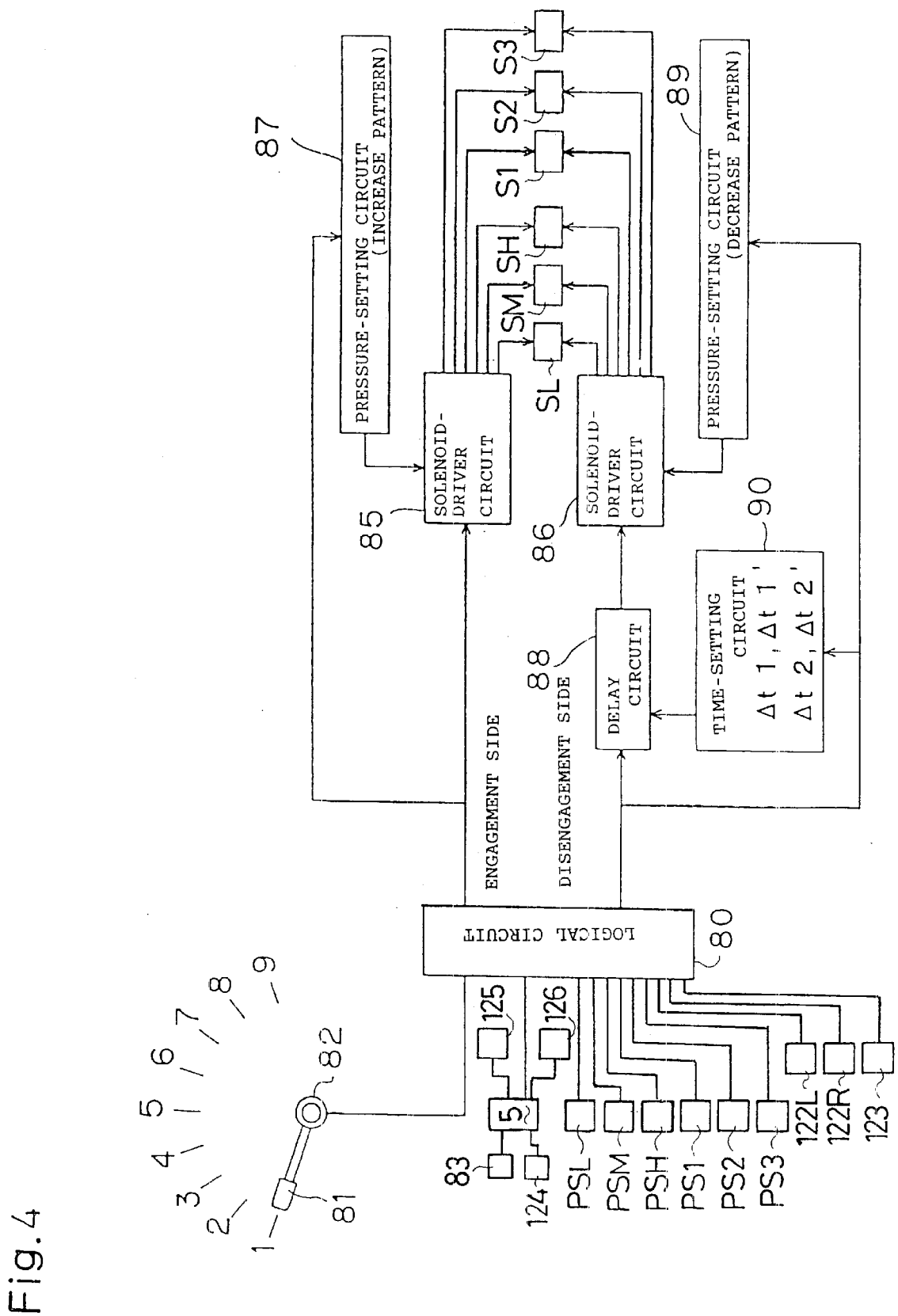
FIG. 4 is a block diagram of another embodiment of an electrical controller circuit.

However, incidents can occur in which an operator overlooks operations of the mode-selector switch 84, the traction load actually exerted is not greater than a logical load even when the above-described switch is set to the work traveling mode, thus causing a hydraulic-pressure-increase property that is different from an actual property. Taking the above into account, two embodiments of the hydraulic pressure control are disclosed below with reference to FIGS. 12 and 13 and FIGS. 14 to 16. The individual embodiment include an automatic load detection structure that is capable of making self-determination as to which one of the control modes should be selected to allow the hydraulic-pressure-increase property for the hydraulic clutches to be selected corresponding to actual states. In conjunction with these control modes, there are provided left and right draft sensors 122L and 122R L to right and left lower links 121 in a work-machine-attaching device 120, a traction sensor 123 on a draw-bar (not shown), and an electronic governor controller 5. FIG. 4 discloses an electrical controller circuit. In the circuit, instead of the mode-selector switch 84, the left and right draft sensors 122L and 122R, the traction sensor 123, and the electronic governor controller 5, which are input means for hydraulic-clutch pressure-increase-property selection, are connected to the input-side interface of the logical circuit 80. A tachometer 83 and a rack-position sensor 124 are connected to the input side of the logical circuit 80. Through the electronic governor controller 5, the logical circuit 80 receives a signal input from the tachometer 83, and in addition, a load-ratio signal obtained through calculation performed according to signals input from the tachometer 83 and the rack-position sensor 124. In addition, the electronic governor controller 5 is connected to a hydraulic lift controller 125 for hydraulically driving the work-machine-attaching device 120 and to an electronic governor 126 (a driving device for a fuel-injection-amount controller rack).

In each of the electrical controller circuits shown in FIGS. 3 and 4, an output side of the logical circuit 80 is connected to a delay circuit 88 that is connected to the input side of a solenoid-driver circuit 86 and to a solenoid-driver circuit 85. The solenoid-driver circuit 85 drives solenoids SL, SM, SH, S1, S2, and S3 of the electromagnetic proportion selector valves VL, VM, VH, V1, V2, and V3 in an exiting direction. The solenoid-driver circuit 86 drives these solenoids to be relived from excitation.

The output side of the logical circuit 80 is connected to the solenoid-driver circuit 85 and a pressure (—increase-property)—setting circuit 87. The output side of the pressure-setting circuit 87 is connected to the solenoid-driver circuit 85. The pressure-setting circuit 87 stores two types of solenoid excitation patterns that are used to obtain two types of pressure-increase properties as represented by pressure-increase graphs U1 and U2 shown in FIG. 10.

In addition, the output side of the logical circuit 80 is connected to the delay circuit 88, a time-setting circuit 90, and a pressure (—decrease-property)—setting circuit 89. The output side of the time-setting circuit 90 is connected to the delay circuit 88. The solenoid-driver circuit 86 is connected to the output side of the delay circuit 88 and to the output side of the pressure-setting circuit 89, and to the solenoid-driver circuit 86. The pressure-setting circuit 89 stores three types of solenoid-excitation-relieving patterns that are used to obtain three types of pressure-decrease properties as represented by pressure-decrease graphs D1, D2, and D3 shown in FIG. 11.

In the logical circuit 80, an engagement-objective clutch and disengagement-objective clutch are determined according to a signal that represents postshift position of the primary speed change lever 81, which is detected through the potentiometer 82. In addition, according to a logic described below, a hydraulic-pressure-decrease property for the disengagement-objective clutches are determined. The electrical controller circuit shown in FIG. 3 performs setting through the mode-selector switch 84. On the other hand, the electrical controller circuit shown in FIG. 4 inputs signals from the right and left draft sensors 122 and the traction sensor 123. The circuit determines a pressure-increase property for engagement-objective clutches according to inputs from the electronic governor controller 5. In addition, according to inputs from the pressure sensors PSL, PSM, PSH, PS1, PS2, the circuit determines the necessity for control that is performed to prevent entrance of foreign substances to the hydraulic clutches.

The logical circuit 80 sends a signal to the solenoid-driver circuit 85. This signal causes the solenoid-driver circuit 85 to send an ON-signal to a solenoid for an objective electromagnetic proportion selector valve. Concurrently, the logical circuit 80 sends to the pressure-setting circuit 87 a pressure-setting signal for selecting one of the solenoid excitation patterns. Thereby, control is performed for transmission of the ON-signal to the solenoid according to the solenoid excitation pattern that has been set in the pressure-setting circuit 87.

Similarly, the logical circuit 80 sends a signal to the solenoid-driver circuit 86, and the signal causes the solenoid-driver circuit 86 to send an OFF-signal to a solenoid for an objective electromagnetic proportion selector valve. Concurrently, the logical circuit 80 sends to the pressure-setting circuit 89 a pressure-setting signal for selecting one of the solenoid nonexcitation patterns. Thereby, control is performed for transmission of the OFF-signal to the solenoid according to the solenoid excitation pattern that has been set in the pressure-setting circuit 89.

In addition to the logical circuit 80, similar electrical controller circuits 85, 86, 87, 88, 89, and 90 are provided either in the above-described controller 4 or in the primary-speed-change hydraulic valve unit 3. According to the solenoid-driver circuit 85 and the solenoid-driver circuit 86, control signals (ON/OFF signals) are sent to objectives of the solenoids SL, SM, SH, S1, S2, and S3 of the electromagnetic proportion selector valves VL, VM, VH, V1, V2, which are provided in the primary-speed-change hydraulic valve unit 3.

Figure 5:
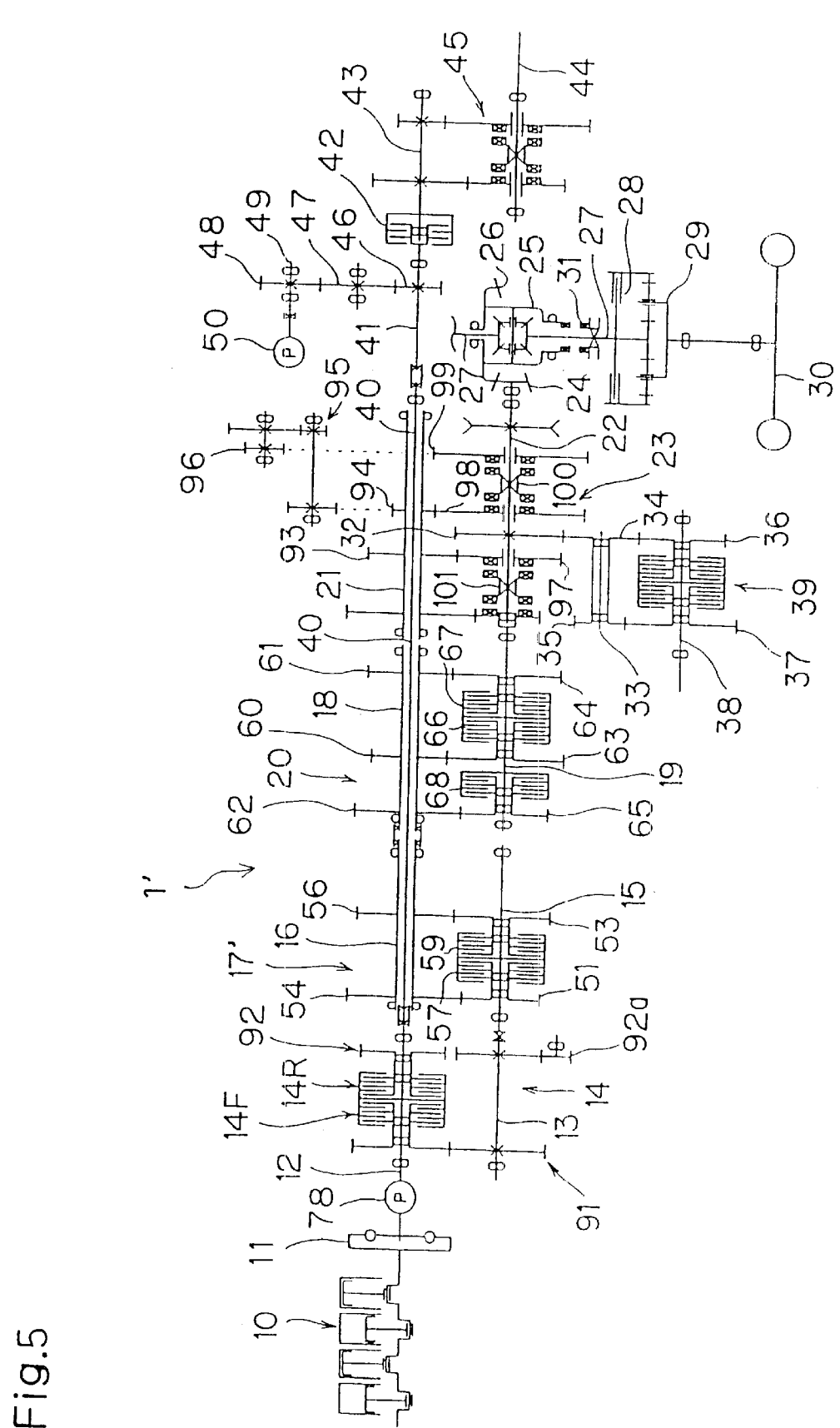
FIG. 5 is a skeletal view of a tractor transmission system having a six-step-variable-speed-type hydraulic primary speed change mechanism 1'.

Hereinbelow, a description will be made regarding the transmission system for the work vehicle (tractor) equipped with the primary speed change mechanism 1' of the six-step-speed-change type, which is shown in FIG. 5.

Individual components and constructions in the transmission system are the same as those shown in FIG. 1, except for the first hydraulic type speed change unit 17'. The first hydraulic type speed change unit 17' shown in FIG. 1 is configured to exclude the intermediate-speed-step gear train, that is, the gears 52 and 55, to thereby enable two-step speed changes. In addition, with the overall primary speed change mechanism 1' configured to include the combination of the first hydraulic type speed change unit 17' and the second hydraulic type speed change unit 20, totally six-step speed changes are enabled.

Figure 2:
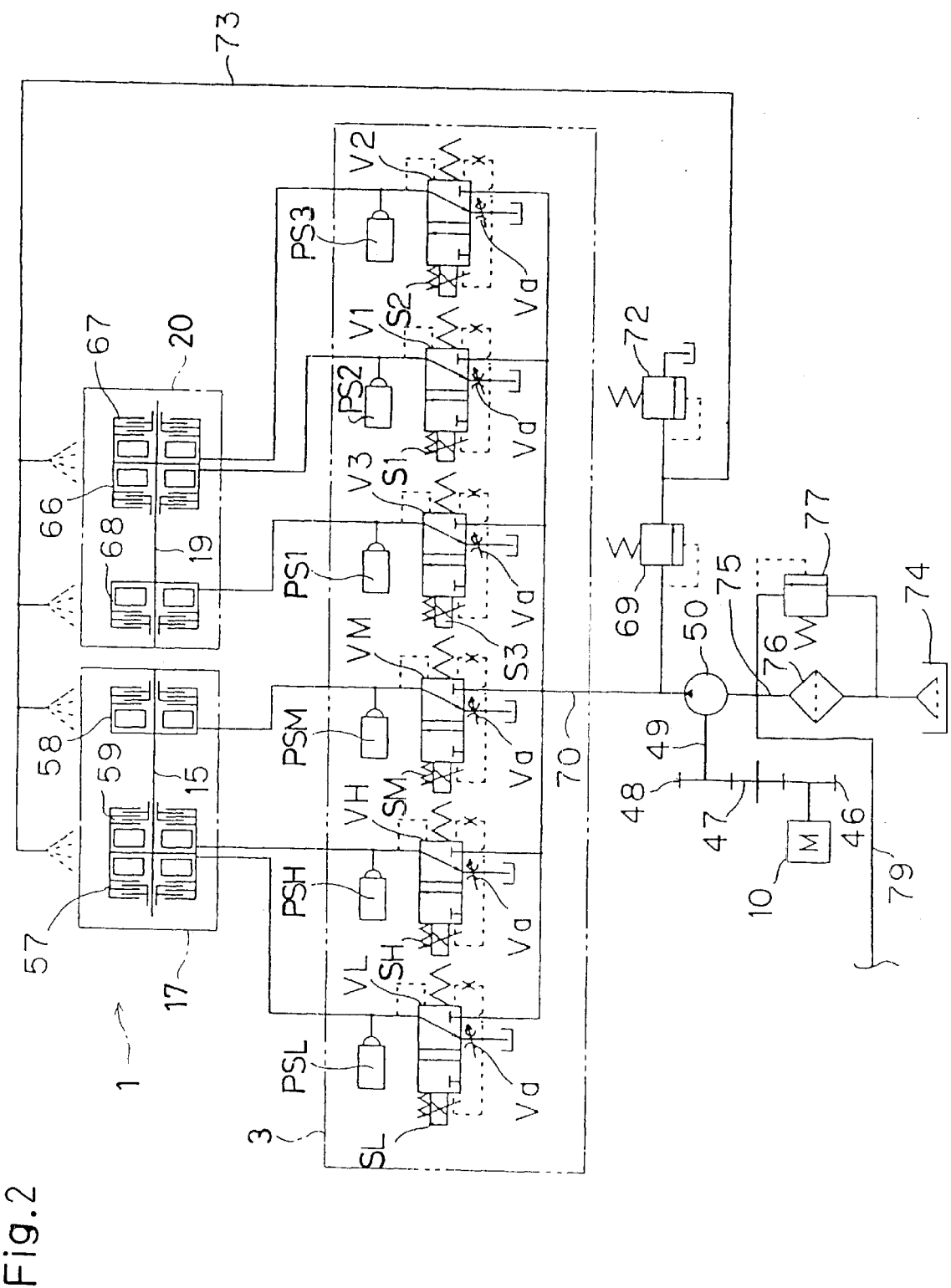
FIG. 2 is a diagram of a hydraulic-clutch-controlling hydraulic circuit in the primary speed change mechanism 1.

Specifically, as shown in FIG. 2, according to combinations of alternative connections of the hydraulic clutches 57 and 59 and alternative connections of the hydraulic clutches 66, 67, and 68, the first and second hydraulic type speed change units 17' and 20 are set so as to obtain first to sixth speed ratios (output rotation speed/input rotation speed; i.e., the rotation speed of the second speed change shaft 19/rotation speed of the first drive shaft 15)

TABLE 2

| Speed ratios | Hydraulic clutches connected in the first hydraulic type speed change unit 17 | Hydraulic clutches connected in the second hydraulic type speed change unit 20 |
| --- | --- | --- |
| 1st | 57 | 66 |
| 2nd | 59 | 66 |
| 3rd | 57 | 67 |
| 4th | 59 | 67 |
| 5th | 57 | 68 |
| 6th | 59 | 68 |

Figure 6:
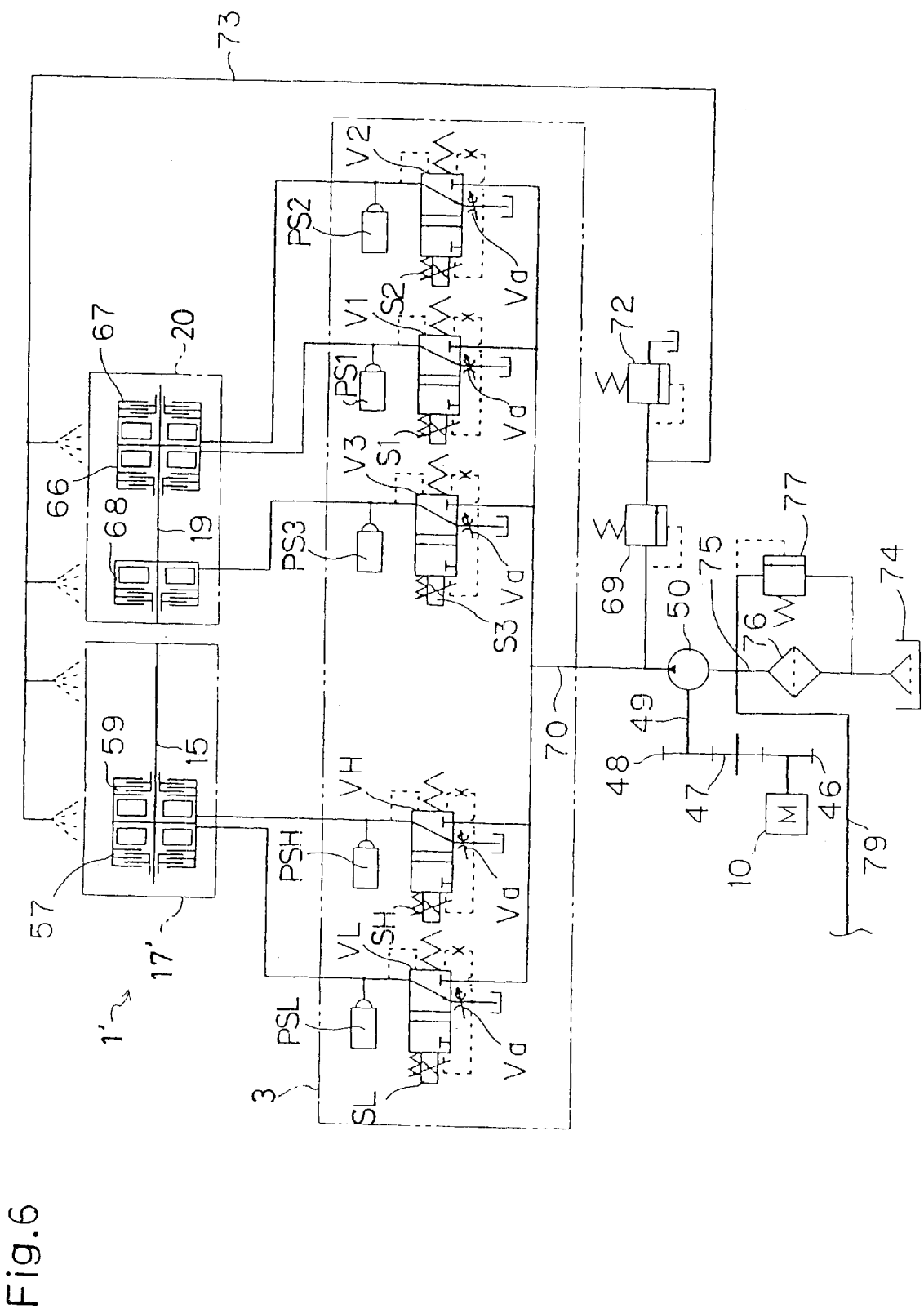
FIG. 6 is a diagram of a hydraulic-clutch-controlling hydraulic circuit in the primary speed change mechanism 1'.

FIG. 6 shows a hydraulic-clutch-controlling hydraulic circuit in the primary speed-changing mechanism 1' shown in FIG. 5. The same reference numerals/symbols as those shown in FIG. 2 represent the same members shown therein. Although an electrical controller circuit is not disclosed therein, it is configured such that the pressure sensor PS and the solenoid SM are removed from the electrical controller circuit shown in FIG. 4 or 5, and first to sixth speed positions of a primary speed change lever 81 therein are included.

FIGS. 7 and 8 each show the tractor employing the electrical controller system shown in either FIG. 1 or FIG. 5. The members shown with the reference numerals have already been described in connection with the transmission system shown in FIGS. 1 to 4. The tractor includes a load-detecting means used in determination of a pressure increase property for engagement-objective clutches, and employs the electrical controller circuit shown in FIG. 4 rather than that shown in FIG. 3. In addition, the primary-speed-change hydraulic valve unit 3 shown in FIG. 9 is disposed in the position shown in FIG. 8, and as described above, it is intended for the six-step-type primary speed change mechanism 11 shown in FIG. 5. To use it for the nine-step-type primary speed change mechanism 1 shown in FIG. 1, the configuration may be modified such that the valve device is replaced with a valve device in which the electromagnetic proportion selector valve VM and the pressure sensor PSM are added and stored.

Hereinbelow, a description will be made regarding the hydraulic pressure control in the hydraulic-clutch-included speed change mechanism of the present invention. The hydraulic pressure control described below may be applied either to the nine-step-type primary speed change mechanism 1 shown in FIG. 1 or to the six-step-type primary speed change mechanism 1' shown in FIG. 5.

Figure 10:
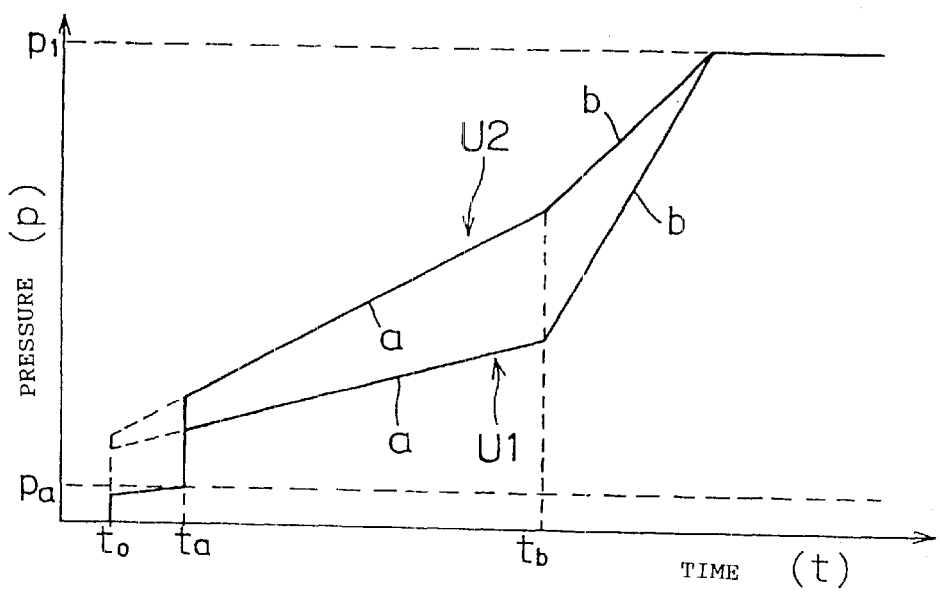
FIG. 10 is a time-transitional hydraulic pressure graph showing a pressure-increase property for an engagement-objective clutch.

FIG. 10 shows a pressure-increase property for an engagement-objective clutch at the time of speed-changing. Specifically, from an engagement start time $t_0$ when an ON-signal is fed to an objective solenoid (excitation is started), a clutch-operating hydraulic pressure p is gradually increased to finally reach a normal hydraulic pressure $p_1$, as shown by pressure-increase graphs U1 and U2.

In the pressure-increase graphs U1 and U2, the low-level pressure-increase graph U1 is set at a road-travel time when a travel load is low, whereas the high level pressure-increase graph U2 is set at a work-travel time when the travel load is high. When the travel load is high, torque transmission efficiency needs to urged to increase, and a load resistance force needs to be exerted. At the road-travel time when the travel load is low, since amenity is required, shock that can occur according to hydraulic-pressure rise at the time of clutch-shift operation needs to be minimized. In a configuration using the electrical controller circuit shown in FIG. 3, an operator uses the mode-selector switch 84 to determine which one of the pressure-increase graphs U1 and U2 is set. In a configuration using the electrical controller circuit shown in FIG. 4, determination regarding which one of the pressure-increase graphs U1 and U2 is set is dependent on determination that is made in the logical circuit 80. The determination is made in the logical circuit 80 according to either signals input from the right/left draft sensors 122 and the traction sensor 123 shown in FIG. 8 or an engine-load-ratio signal that is input through the electronic governor controller 5.

Figure 12:
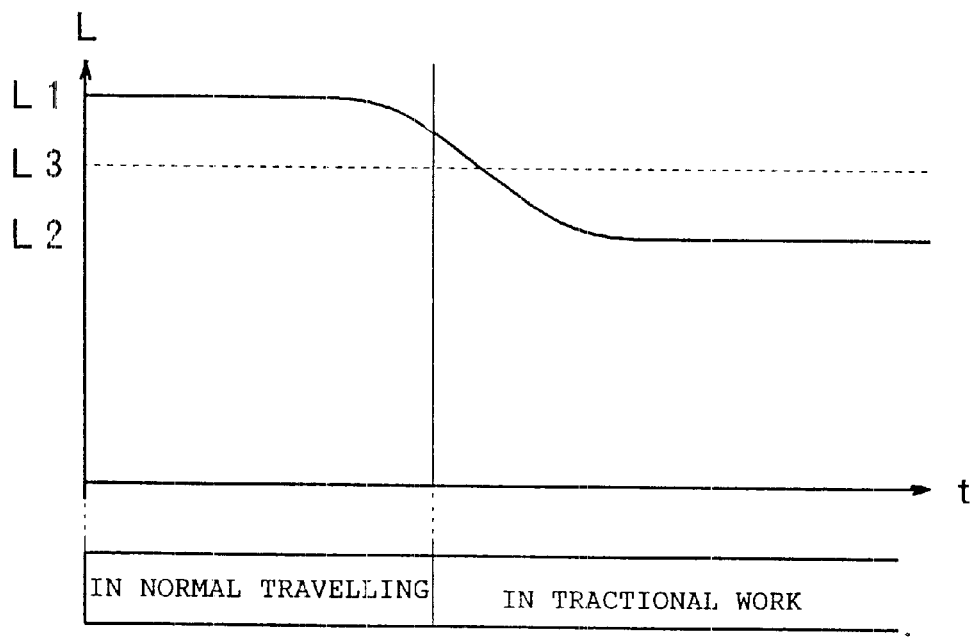
FIG. 12 is a time-transitional voltage graph regarding left and right draft sensors 112R and 112L functioning as load-detecting means for pressure-increase-property determination.

Hereinbelow, referring to FIGS. 12 and 13, a description will be made regarding a method for determining a pressure-increase property for an engagement-objective clutch according to load detection that is performed using the right and left draft sensors 122L and 122R and the traction sensor 123.

When the right/left lower link 121 is pulled backward, the right/left draft sensor 122L/122R detects a load thereof. Depending on the pulling force, variations occur in the value of voltage input to the logical circuit 80. In FIG. 12, the sum of output voltage values of the two draft sensors 122 is represented by a load voltage value L. When the load voltage value L is a value L1 at a normal (on-the-road) travel time, the load voltage value L is a value L2, which is lower than the value L1, in a tractional-work travel time. A threshold value L3 is set between the values L1 and L2, and it is assumed that a case where the load voltage value L is equal to or lower than the threshold value L3 is represented as a selection zone of a pressure-increase property for a primary-speed-change hydraulic clutch at a traction-load mode.

On the other hand, the traction sensor 123 turns OFF at a normal (on-the-road) travel time, and it turns ON upon being imposed by a load at a tractional-work travel time. When the traction sensor 123 is turned ON, selection is made for a pressure-increase property for the primary-speed-change hydraulic clutch at a tractional-load mode.

Figure 13:
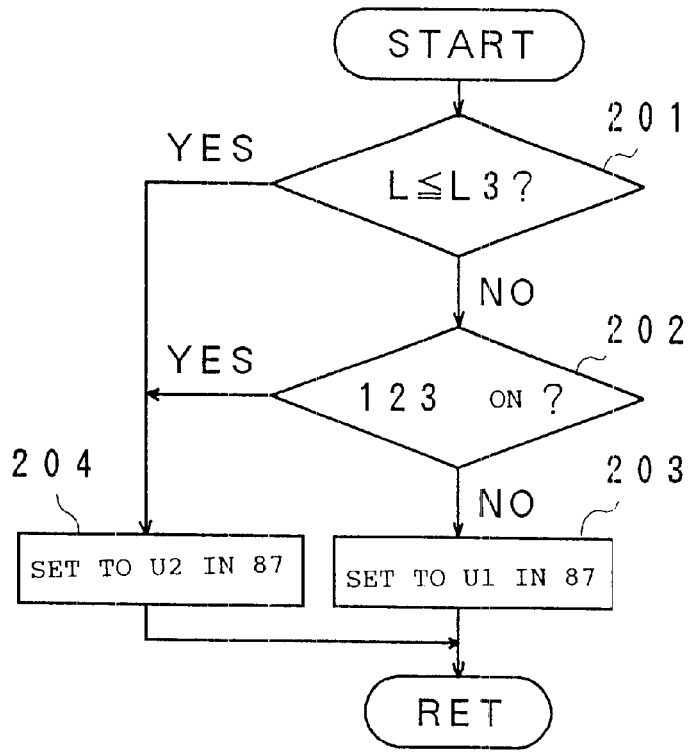
FIG. 13 is a flowchart of pressure-increase-property determination using a draft sensor 122 and a traction sensor 123 that are disposed on the left and right sides.

Specifically, as shown in a flowchart in FIG. 13, in at least one of the cases where the load voltage value L input from the right/left draft sensor 122 to the logical circuit 80 is equal to or less than L3 (step 201) and where the traction sensor 123 is turned ON (step 202), the tractional-load-mode pressure-increase graph U2 is selected (step 204). In the other case, i.e., when the load voltage value L of the right/left draft sensor 122L/122R is turned OFF, and concurrently, the traction sensor 123 is turned OFF, the normal-travel-mode pressure-increase graph U1 is selected (step 203).

Hereinbelow, referring to FIGS. 14 to 16, an introduction is made regarding another embodiment that determines a pressure-increase pattern according to detection by the electronic governor of the engine for engine loads (load ratios). The embodiment of the control may be employed by a vehicle mounting a diesel engine corresponding to the engine 10.

As shown in FIG. 4, the electronic governor controller 5 is connected to the input-side interface of the logical circuit 80 to thereby allow load-ratio signals in the electronic governor controller to be input to the logical circuit 80. The electronic governor controller 5 is connected to a hydraulic-pressure lift controller 125, the above-described tachometer 83 that detects the engine revolution frequency, and the rack-position sensor 124 that detects the position of the fuel-injection-amount controller rack of the governor.

The electronic governor controller 5 calculates load ratios according to inputs from the tachometer 83 and the rack-position sensor 124. In addition, it inputs an engine-load-ratio signal, which is output based on the load ratios, to the hydraulic-pressure lift controller 125 to thereby use engine-load-ratio signal to lift a hydraulic lift of the work-machine-attaching device 120. Concurrently, the electronic governor controller 5 inputs an engine-load-ratio signal, uses an output control signal fed back from the logical circuit 80 to move the rack, and thereby controls the fuel-injection amount. Among these engine-load-ratio signals issued from the electronic governor controller 5, the signal for the hydraulic-pressure lift controller 125 is output at a long frequency to prevent overcontrol that can reduce work efficiency. The signal for the logical circuit 80 is output at a short frequency so that the engine revolution frequency can be quickly controlled corresponding to the load. By use of the signal output to the logical circuit 80 at the short frequency without performing modification, pressureincrease properties can be quickly determined corresponding to load ratios, thereby allowing the signal to be effectively used for hydraulic-pressure control of the hydraulic clutch.

Figure 14:
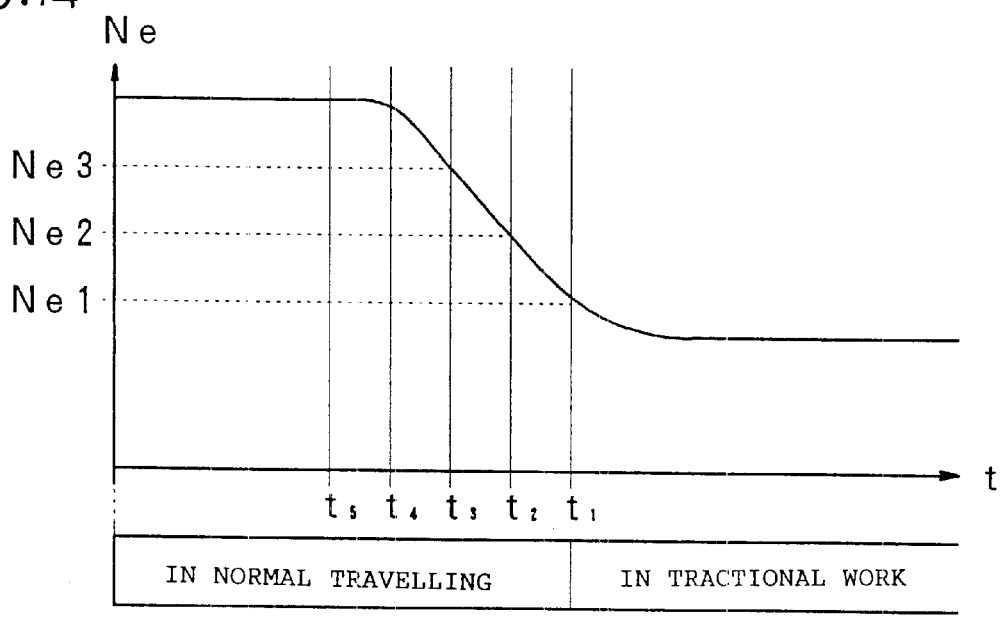
FIG. 14 is a time-transitional graph of engine revolution frequencies detected for the pressure-increase-property determination.
Figure 15:
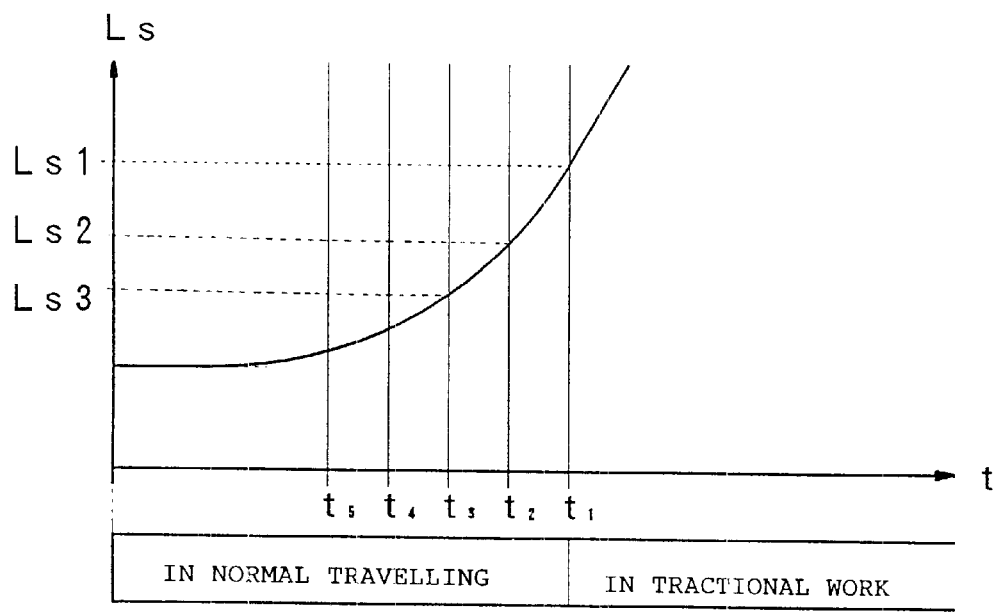
FIG. 15 is a time-transitional graph of rack positions detected for the pressure-increase-property determination.

As shown in FIG. 14, an engine revolution frequency Ne represented by a voltage input from the tachometer 83 to the electronic governor controller 5 is assumed to be changed from Ne3 to Ne1 that is lower than Ne3. On the other hand, as shown in FIG. 15, a rack position Ls, of which data has been input from the rack-position sensor 124 to the electronic governor controller 5, is assumed to be changed from Ls3 to Ls1 (on a side where the fuel-injection amount is relatively large) that is higher than Ls3. In this way, when the reduction in the engine revolution frequency and the lifting-up (i.e., increase in the fuel-injection amount) concurrently occur, and in addition, the individual reduction and lifting-up appear with specific properties, determination is made such that a tractional load is imposed on the vehicle, and the pressure-increase graph U2 is set in the pressure-setting circuit 87.

Figure 16A:
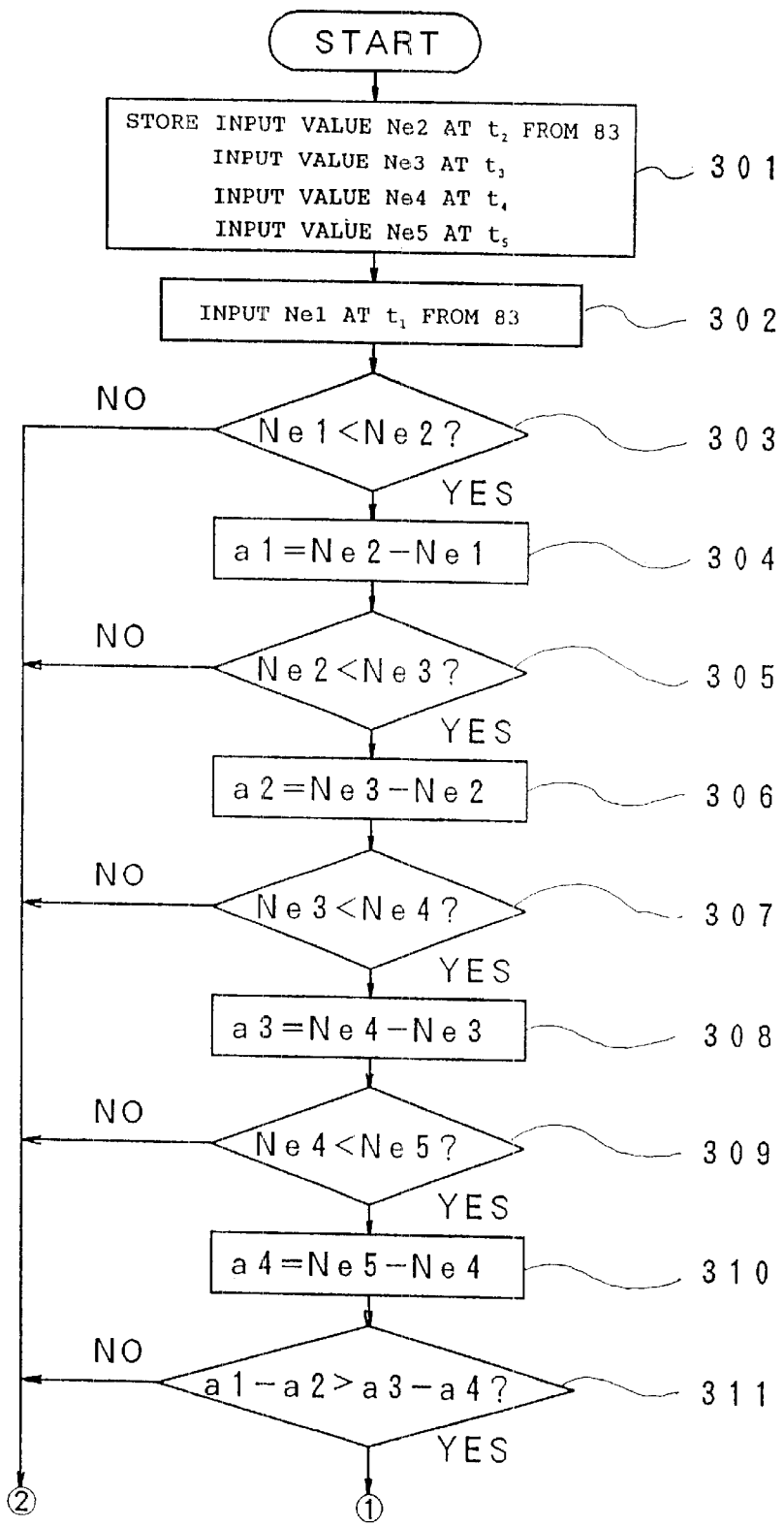

Hereinbelow, referring to FIGS. 16A and 16B, a description will be made regarding a pressure-increase-property setting flow that is carried out based on detection of the engine revolution frequency and the rack position. First, as prerequisite processing, the tachometer 83 detects engine revolution frequencies Ne at a specific short frequency, the rack-position sensor 124 detects rack positions Ls at the same frequency as that for the engine revolution frequencies Ne, and values of the detections are serially stored therein. In step 301, among engine revolution frequencies Ne serially detected, the circuit stores at least engine revolution frequencies Ne2 (immediate-previously detected revolution frequency), Ne3 (second-previously detected revolution frequency), Ne4 (third-previously detected revolution frequency), and Ne5 (fourth-previously detected revolution frequency). Concurrently (in step 312 in the flow for the convenience of description), among rack positions Ls serially detected, the system stores at least rack positions Ls2 (immediate-previously detected position at $t_2$), Ls3 (second-previously detected position at $t_3$), Ls4 (third-previously detected position at $t_4$), and Ls5 (fourth-previously detected position at $t_5$).

Then, a new engine revolution frequency Ne is detected by the tachometer 83 at a current detection start time $t_1$, and a signal representing a currently detected engine revolution frequency Ne1 is input to the electronic governor controller 5 (step 302). Then, the engine revolution frequency Ne2 immediate-previously detected is retrieved, and the current engine revolution frequency Ne1 is compared to the previous Ne2 to verify Whether the reduction in the intended engine revolution frequency has been achieved; that is, it verifies whether Ne1<Ne2 has been achieved (step 303). After the verification of the reduction in the engine revolution frequency, a calculation of a reduction amount a1 (=Ne2−Ne1) is performed (step 304). In addition, data of the stored engine revolution frequencies Ne2, Ne3, Ne4, and Ne5 is retrieved, and verification is performed for at least the reduction in the engine revolution frequency from the fourth-previously detected frequency. Subsequently, calculations are performed to obtain reduction amounts a2 (=Ne3−Ne2), a3 (=Ne4−Ne3), and a4 (=Ne5−Ne4) (steps 305 to 310) to thereby verify whether a1−a2>a3−a4, that is, the increase in the reduction ratio of the engine revolution frequency, has been achieved (step 11).

If the engine revolution frequency is reduced, and the reduction amount per unit time in that case is increased, it is conceivable that the speed has been reduced because of either acceleration setting or a tractional load. If the speed has been reduced because of the acceleration setting, the rack position in an electronic governor 126 is supposed to be at a fuel-injection-amount reduced side (a rack-position detection voltage should have been reduced). On the other hand, in a case where the engine revolution frequency has been reduced, but the rack position has been shifted to a fuel-injection-amount increased side (the rack-position detection voltage is increased) despite of the fact that the engine revolution frequency has been reduced, the case can be determined that the electronic governor 126 has performed control corresponding to the load.

Under the above concepts, the Ls2, Ls3, Ls4, and Ls5 are stored (step 312), as described above. In-this state, a new rack position Ls is detected by the rack-position sensor 124 at a current detection start time $t_1$, and a signal representing a detected rack position Ls1 is input to the electronic governor controller 5 (step 313). Then, data of the engine revolution frequency Ls2 immediate-previously detected is retrieved, and the current rack position Ls1 is compared to the previous Ls2 to thereby verify whether the rack position has been lifted up (shifted to a fuel-injection-amount increased side), that is, to verify whether Ls1>Ls2 has been achieved (step 314). After the verification of the lift-up in the rack position, a calculation of a reduction amount b1 (=Ls1−Ls2) is performed (step 315). In addition, stored data of the rack positions Ls2, Ls3, Ls4, and Ls5 is retrieved, and verification is performed for at least the reduction in the engine revolution frequency from the fourth-previously detected result. Subsequently, calculations are performed to obtain reduction amounts b2 (=Ls3−Ls2), b3 (=Ls4 Ls3), and b4 (=Ls5−Ls4) (steps 316 to 321) to thereby verify whether b1−b2>b3−b4, that is, the increase in the increase-shift ratio regarding the rack position, is achieved (step 322).

As described below, the pressure-decrease properties (pressure-decrease graphs) are determined such that the solenoid nonexcitation patterns in the pressure-setting circuit 89 are selected corresponding to engine revolution frequencies and the like detected by the tachometer 83. In order to allow the pressure-increase property to be modified corresponding to loads, the pressure-decrease property for disengagement-objective clutches may also be established to be modified based on engine-load-ratio signals input to the logical circuit 80 from either load-ratio-detecting means such as the right and left draft sensors 122 and the traction sensor 123 or the electronic governor controller 5.

Hereinbelow, referring back to FIG. 10, a detailed description will be made regarding the overall increase processing of an operating hydraulic pressure p. A solenoid for an objective hydraulic clutch at a clutch-engagement start time $t_0$ is turned ON, and supply of fluid to a fluid chamber of the objective hydraulic clutch is started. The operating hydraulic pressure p in the fluid chamber slightly rises at the time $t_0$, and then gradually increases. At a time ta when some time has passed from the time $t_0$, the fluid chamber becomes full of fluid, upon detection of arrival of hydraulic pressure p at a piston-holding pressure $P_a$ (i.e., a pressure allowing a piston to operate), the hydraulic pressure p is quickly increased to a normal pressure at that time.

In a period up to a time tb, as shown in part of each of the pressure-increase graphs U1 and U2, the hydraulic pressure p gradually increases, and the clutch stays at a slip state. At the time tb, the hydraulic pressure p reaches a value required for complete engagement of the clutch. Subsequently, as shown in a part b of each of the pressure-increase graphs U1 and U2, the hydraulic pressure p is gradually increased up to a normal pressure $P_1$ to thereby cause the clutch to a pressed state. When the hydraulic pressure p reaches the normal pressure $P_1$, the clutch engagement is completed.

Figure 11:
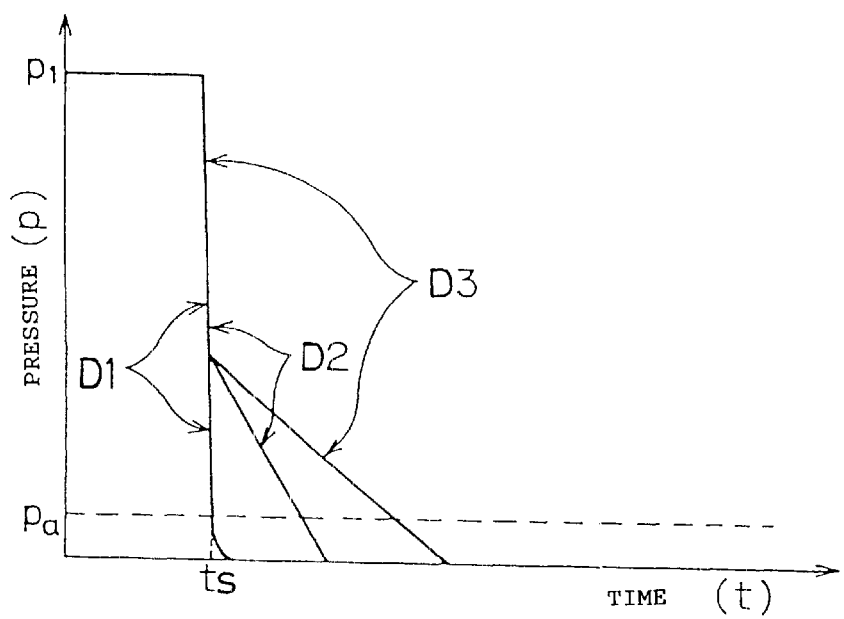
FIG. 11 is a time-transitional hydraulic pressure graph showing a pressure-decrease property for a disengagement-objective clutch.

FIG. 11 shows a hydraulic-pressure-decrease property for a disengagement-objective clutch at the time of speed-changing. Specifically, it shows cases where, from a time ts when an OFF-signal is applied to an objective solenoid (excitation is started therefor), a clutch-operating normal pressure p, is reduced as represented by hydraulic-pressure-decrease property graphs D1, D2, and D3. The hydraulic-pressure-decrease property graph D1 represents a case where, immediately after the solenoid is relieved from excitation, the pressure p is quickly reduced from the normal pressure $p_1$ to a piston-holding pressure $P_a$. The hydraulic-pressure-decrease property graphs D2 and D3 each represent a case where after the pressure p is quickly reduced to a pressure that is higher than the piston-holding pressure $P_a$, it is gradually increased to 0 (or the lowest value in the vicinity). Therefore, the reduction degree of D2 is greater than that of D3.

In either case, the hydraulic clutch is urged toward a neutral position. The overall disengagement period of the clutch, i.g., a period in which the pressure p is changed to 0 (or the lowest value in the vicinity)(even in the case of setting of the hydraulic-pressure-decrease property graph D3 representing the slowest pressure reduction) is shorter than the overall disengagement period described above.

Pressure-decrease property graphs are not limited to the three graphs D1 to D3. The angle in the gentle-sloped pressure-decrease portion as can be seen in either D2 or D3 may be variously set so that control as represented by other pressure-decrease property graphs can be implemented. However, for the convenience of description, embodiments shown in FIGS. 19 to 22, which will be described below, are assumed to have the capacity of performing control represented by the hydraulic-pressure-decrease property graphs D1, D2, and D3.

The pressure is gradually increased, and the hydraulic-pressure-increase property is varied in the course from a to b according to the control of an application voltage to each of the solenoids. In addition, the variable aperture of the individual electromagnetic proportion selector valve is used to slowly vary the hydraulic pressure as represented by the hydraulic-pressure-decrease property graph D2 or D3. In the hydraulic circuit diagram shown in FIG. 2, the individual variable aperture is shown in outside portion with reference symbol Va. According to the variations in the voltage applied to the individual variable aperture Va, the amount of drain from the individual electromagnetic proportion selector valve is controlled, thereby causing the decrease behavior of the hydraulic pressure to vary.

Hereinbelow, referring to FIGS. 17 to 26, a description will be made regarding the relationship between the engagement course and the disengagement course of a clutch at time of speed-changing.

First, as a basic concept, either the first hydraulic type speed change unit 17 or the second hydraulic type speed change unit 20 is configured so as not to encounter total power cut during speed-changing. When one of the speed change units encounters a non-transmissible state, that is, when all hydraulic clutches in one of the speed change units are held in disengaged states, transmission is not performed in the primary speed exchange device, that is, transmission is not performed between the first drive shaft 15 to the second speed change shaft 19. If work travel was performed in the above state, the vehicle might be unexpectedly stopped, and in addition, a great shock giving discomfort would be caused by hydraulic-pressure rise according to clutch engagement performed from the above state.

As described above, the clutch-engagement period is longer than the clutch-disengagement period (even with any one of the pressure-decrease patterns being set), and the objective-clutch-operating hydraulic pressure is gradually increased. Taking the above into account, the present invention is arranged such that the reduction in hydraulic pressure of a disengagement-objective clutch is started during gradual increase in pressure for an engagement-objective clutch. Thereby, a period in which a pressure p for operating the disengaging clutch is controlled to be higher than the piston-holding pressure $P_a$ (a state where the clutch slips) is controlled to overlap a period in which a pressure p for operating the engaging clutch is higher than the piston-holding pressure $P_a$ (a state where the clutch is slipping). That is, even when the transmission efficiency is reduced to the lowest-value level, either the disengagement-objective clutch or the engagement-objective clutch is controlled to slip, thereby avoiding a case where one of the clutches is forced to be in a disengaged state, and the primary speed change mechanism is forced to be in a non-transmissible state.

In this connection, for example, as shown in time-transitional graphs of FIGS. 17 and 19 regarding hydraulic-clutch-operating hydraulic pressures (graphs each showing a hydraulic-clutch-operating pressure p relative to a time t), regions where an in-engagement clutch and an in-disengagement clutch commonly slip (hereinbelow, the aforementioned region will be referred to as a "common slip region") are shown by slanting lines. The state and the area of the common slip region are preferably set so that speed-changing (speed-position shifting) can be performed most smoothly; that is, good speed-change feeling can be secured without being influenced by the capacity of the hydraulic pump 50.

To change the speed by shifting clutches of one of the primary speed change mechanisms 1 and 1' through shifting of the primary speed change lever 81, as can be seen from Tables 1 and 2, there are two cases. In one of the cases, one hydraulic clutch is newly engaged, and another engaged hydraulic clutch is disengaged in only one of the first hydraulic type speed change unit 17 (17') and the second hydraulic type speed change unit 20. In the other case, one hydraulic clutch is newly engaged, and another engaged hydraulic clutch is disengaged in each of the two first hydraulic type speed change units 17 (17') and 20.

In the former case, for example, the following operations are performed. In the primary speed change mechanism 1, when the primary speed change lever 81 is shifted up from the second speed position to the fifth speed position, the engaged hydraulic clutch 58 is remained unchanged in the first hydraulic type speed change unit 17; and the hydraulic clutch 67 is newly engaged, and the engaged hydraulic clutch 66 is disengaged in the second hydraulic type speed change unit 20. When the primary speed change lever 81 is shifted down from the sixth speed position to the fourth speed position, the engaged hydraulic clutch 67 is remained unchanged in the second hydraulic type speed change unit 20; and the hydraulic clutch 57 is newly engaged, and the engaged hydraulic clutch 59 is disengaged in the first hydraulic-type speed change unit 17.

In the latter case, for example, the following operations are performed. In the primary speed change mechanism 1, when the primary speed change lever 81 is shifted up from the second speed position to the sixth speed position, the engaged hydraulic clutch 59 in the first hydraulic type speed change unit 17 and the hydraulic clutch 67 in the second hydraulic type speed change unit 20 are newly engaged, and the hydraulic clutch 58 in the first hydraulic type speed change unit 17 and the hydraulic clutch and hydraulic clutch 66 in the second hydraulic type speed change unit 20 are disengaged. When the primary speed change lever 81 is shifted down from the ninth speed position to the fifth speed position, the engaged hydraulic clutch 58 in the first hydraulic type speed change unit 17 and the hydraulic clutch 67 in the second hydraulic type speed change unit 20 are newly engaged, and the hydraulic clutch 59 in the first hydraulic type speed change unit 17 and the hydraulic clutch and hydraulic clutch 68 in the second hydraulic type speed change unit 20 are disengaged.

In the primary speed change mechanism 1', in the former case, for example, when the primary speed change lever 81 is either shifted up or shifted down between the first speed position and the second speed position, the hydraulic clutch 66 is remained engaged in the second hydraulic type speed change unit 20, one of the hydraulic clutches 57 and 59 is engaged in the first hydraulic type speed change unit 17', and the other hydraulic clutch is disengaged. In the latter case, for example, when the primary speed change lever 81 is either shifted up or shifted down between the second speed position and the third speed position, engaged-clutch exchange is performed between the hydraulic clutches 57 and 59 in the first hydraulic type speed change unit 17, and engaged-clutch exchange is performed between the hydraulic clutches 66 and 67 in the second hydraulic type speed change unit 20.

In short, two speed changes can be achieved. One of the speed changes is achieved such that, in the overall primary speed change mechanism, one hydraulic clutch is disengaged, and one hydraulic clutch is newly engaged (which hereinbelow will be referred to as "speed-changing with one-objective-based hydraulic clutches being disengaged/engaged"). The other speed change is achieved such that, in the overall primary speed change mechanism, two hydraulic clutches are disengaged, and two hydraulic clutches are newly engaged (which hereinbelow will be referred to as "speed-changing with two-objective-based hydraulic clutches being disengaged/engaged"). In either case, it is essential to secure the aforementioned common slip region.

FIGS. 17 and 18 each show time-transitional graphs (graphs of operating pressures p relative to a time t) regarding individual hydraulic-clutch-operating hydraulic pressures in the first hydraulic type speed change unit 171 and the second hydraulic type speed change unit 20 on the same time axis. Concurrently, the figures each show time-transitional voltage graphs regarding the pressure sensors. FIG. 17 shows the speed change with one-objective-based hydraulic clutches being disengaged/engaged, in which the primary speed change lever 81 is either shifted up and shifted down between the first speed position and the second speed position. FIG. 18 shows the speed-changing with two-objective-based hydraulic clutches being disengaged/engaged, in which the primary speed change lever 81 is shifted up and shifted down between the second speed position and the third speed position. For each pressure-rising portion of the individual hydraulic-pressure time-transitional graphs in FIGS. 17 and 18, the fluid-chamberfilling-out required period (engagement start time t, to pressure-rising time ta) shown in FIG. 10 is not taken into account, and the pressure is assumed to increase higher than the piston-holding pressure pa as soon as the position of the primary speed change lever 81 has been shifted. In addition, pressure sensors PSL, PSM, PSH, PS1, PS2, and PS3 shown in each of FIGS. 17 and 18 are each—assumed to function as a switch that turns ON when the pressure increases higher than a switch-shifting pressure pb which is set higher than the piston-holding pressure pa.

Hereinbelow, FIG. 17 will be explained. First, when the primary speed change lever 81 is set either to the first speed position or to the second speed position, in the second hydraulic type speed change unit 20, a hydraulic pressure 66p is kept at the normal pressure $P_1$, the pressure sensor PS1 keeps turning ON, individual hydraulic pressures 67p and 68p for the hydraulic clutches 67 and 68 remain to be 0, and the pressure sensors PS2 and PS3 are turned OFF.

In the first hydraulic type speed change unit 17' when the primary speed change lever 81 is shifted up from the second speed position to the first speed position, a hydraulic pressure 59p for the engagement-objective clutch 59 begins to rise, and is then gradually increased to the normal pressure $P_1$. In this course, when a hydraulic pressure 59p reaches the switch-shifting pressure ph, the pressure sensors PSH turns ON. Slightly later than the rise in the pressure 59p, a hydraulic pressure 57p for the disengagement-objective clutch 57 begins to decrease, and a pressure-decrease line portion thereof crosses a pressureincrease line portion of the hydraulic pressure 59p. That is, an operating hydraulic pressure for the disengagement-objective clutch decreases in the course of gradual increase in an operating hydraulic pressure for the engagement-objective clutch. In this way, as shown by the slanting lines, common slip regions of the two hydraulic clutches 57 and 59 are secured. When the decreasing hydraulic pressure 57p is reduced lower than the switch-shifting pressure pb, the pressure sensor PSL in the ON state turns OFF.

Then when the primary speed change lever 81 is shifted down from the second speed position to the first speed position, the hydraulic pressure 57p for the hydraulic clutch 57 begins to rise, and then gradually increases: and the hydraulic pressure 59p for the hydraulic clutch 59 decreases. As described above, common slip regions are secured as in the above case. In the pressure-rising course, when the hydraulic pressure 57p reaches the switch-shifting pressure pb, the pressure sensor PSL in the OFF state turns ON. When the decreasing hydraulic pressure 59p is reduced lower than the switch-shifting pressure pb, the pressure sensor PSH in the ON state turns off.

When the state at the shifted-up (from the first speed position to the second speed position) time is compared to the state at the time of the shifted-down (from the second speed position to the first speed position), the common slip region at the shifted-down time is relatively narrow. At the shifted-down time, since rotational inertia prior to the shifting (in the state of the second speed position) is imposed as a transmission force on a rotation shaft on the secondary side of the clutch, which is engaged/disengaged, the slip regions are controlled to be narrow to allow the speed to be changed smoothly and quickly.

In FIG. 18 showing a case where the speed is changed between the second speed position and the third speed position, hydraulic clutches are disengaged/engaged in each of the first hydraulic type speed change unit 17' and 20. Specifically, in the first hydraulic type speed change unit 17', hydraulic-pressure control as described referring to FIG. 17 is performed for disengagement/engagement operation of the hydraulic clutches 57 and 59 individually at a time of shifting-up (from the second speed position to the third speed position) and at a time of shifting-down (from the third speed position to the second speed position). On the other hand, in the second hydraulic type speed change unit 20, simultaneously with rise in the hydraulic pressure 57*p* for the hydraulic clutch 57, the engagement-objective clutch 67*p* begins to rise, and then gradually increases parallel to the increase in the hydraulic pressure 57*p* up to the normal pressure $P_1$. Simultaneously, in parallel to reduction in the hydraulic pressure 59*p* for the disengagement-objective clutch 59 in the first hydraulic type speed change unit 17', and slightly later than rise in the hydraulic pressure 67*p*, the hydraulic pressure 66*p* for the disengagement-objective clutch 66 decreases. At the shifting-down time, the hydraulic pressure 66*p* for the engagement-objective clutch 66 increases, and the hydraulic pressure 67*p* for the disengagement-objective clutch decreases in synchronization with the increase in the hydraulic pressure 59*p* for the engagement-objective clutch 59 and the reduction in the hydraulic pressure 57*p* for the disengagement-objective clutch 57. In this way, similarly to the time-transitional hydraulic pressure property in the first hydraulic type speed change unit 17', which is shown in FIG. 17, a significantly large common slip region is secured at the shifting-up time in either the first hydraulic type speed change unit 17' or the second hydraulic type speed change unit 20. ON/OFF operations of the pressure sensors for the individual hydraulic clutches are disclosed.

FIGS. 17 and 18 are adaptive to the primary speed change mechanism 1'. To arrange them to be adaptive to the primary speed change mechanism 1, modification is made such that, in the case of FIG. 17, the operating hydraulic pressure 59*p* for the high-speed-use hydraulic clutch 59 is replaced with the operating hydraulic pressure 58*p* for the intermediate-speed-use intermediate-speed clutch 58 in the first hydraulic type speed change unit 17, and the hydraulic clutch 59 is controlled to transit at substantially in all periods. In addition, the time-transitional voltage graph regarding the pressure sensors PSH is replaced with the time-transitional voltage graph regarding the pressure sensor PSM, and the pressure sensors PSH is controlled to be in the OFF state in all periods.

FIG. 18 shows the case of the speed-change with two-objective-based hydraulic clutches being disengaged/engaged. In the primary speed change mechanism 1, since the change is performed by simply exchanging between the disengagement/engagement operations of the intermediate-speed clutches 58 and 59 only in the first hydraulic type speed change unit 17, it is not applicable. To arrange the case of FIG. 18 to be adaptive to the primary speed change mechanism 1, modification is made such that, for example, the primary speed change lever 81 is shifted between the third speed position and the fourth speed position. In this case, at the shifting-up time in the first hydraulic type speed change unit 17, the hydraulic clutch 59 is controlled to disengage, and the hydraulic clutch 57 is controlled to engage. Therefore, the time-transitional graphs regarding the hydraulic pressures 57*p* and 59*p*, and the time-transitional voltage graphs regarding the pressure sensors PSL and PSH, which are shown in FIG. 18, can be used without modification; and the intermediate-speed clutch 58 transits at substantially 0 in all periods, and the pressure sensor PSM transits in the OFF state in all periods. In the second hydraulic type speed change unit 20, the disengagement-objective clutches 66 and 67 are controlled to disengage and engage, and the hydraulic clutch 68 is controlled to remain in a disengaged state. Therefore, the hydraulic-pressure time-transitional graphs and the pressure-sensor time-transitional voltage graphs may be used without modification.

The above describes that, in the cases shown in FIGS. 17 and 18, the fluid-chamber-filling-out required periods for engagement-objective clutches between the hydraulic clutches 57 and 59 are not taken into account for the convenience of description. In practice, however, the hydraulic-pressure time-transitional graphs take the forms, as shown in FIG. 10, which have the fluid-chamber-filling-out required periods. The fluid-chamber-filling-out required period varies depending on whether the hydraulic clutches are disengaged/engaged at the time of speed-changing with the one-objective-based clutches or the two-objective-base clutches. Specifically, the fluid-chamber-filling-out required period increases substantially twice as much, compared to the case of the single target set. In addition, the required period varies depending on the engine revolution frequency. Specifically, proportionally to the reduction in the engine revolution frequency, driving forces of the hydraulic pumps are reduced. Therefore, hydraulic pressures are slowly increased to increase the fluid-chamber-filling-out required period.

Suppose a delay time of a disengagement start time ts with respect to the engagement start time $t_0$ is fixedly set to obtain a suitable common slip region corresponding to the operation for causing a one-objective-based hydraulic clutches to disengage/engage. In this case, when speed-changing with one-objective-based hydraulic clutches being disengaged/engaged is performed, the pressure-rising time ta is delayed greater than that in the former case to thereby relatively reduce the delay time of the disengagement start time ts with respect to the pressure-rising time ta. Therefore, the common slip region is narrower than the common slip region that can be obtained in the speed-change pattern for causing speed-changing with the one-objective-based hydraulic clutches being disengaged/engaged. That is, the area of the common slip region is small to thereby impair the speed-change feeling. Depending on the case, the disengagement start time ts can be earlier than the pressure-rising time ts to thereby disable a common slip region to be produced (that is, after a disengagement-objective clutch is disengaged away from a slip state, the hydraulic pressure for an engagement-objective clutch rises to cause it to be in a slip state). The incident of this kind does not conform to the above-described basic concept.

The present invention is therefore made to compensate for the difference in the clutch-fluid-chamber-filling-out required periods in the two cases. To perform the compensation, the invention allows delay times of the disengagement start time ts with respect to the engagement start time $t_0$ to be set differently corresponding to the individual cases.

For delay times of the disengagement start time ts with respect to the engagement start time $t_0$, as shown in FIG. 3 or 4, a certain number of delay patterns is stored in the time-setting circuit 90. According to an input signal from a member such as the potentiometer 82 or the tachometer 83, the logical circuit 80 outputs a delay-pattern-selection parameter to the time-setting circuit 90. A solenoid control signal based on a selected delay pattern is input from the time-setting circuit 90 to the delay circuit 88. The delay circuit 88 is used to delay an OFF-drive time of a solenoid provided to the solenoid-driver circuit 86 by a predetermined amount, thereby allowing the delay time to be obtained.

In addition, corresponding to the total of four patterns at the shifting-up time and the shifting-down time in a rated-revolution state and a low-speed-revolution state of the engine, the aforementioned delay times are set, and concurrently, a pressure-decrease property for disengagement-objective clutches is set.

Specifically, the hydraulic-pressure control patterns for the primary-speed-change hydraulic clutches are provided corresponding to four divisional cases at the shifting-up time and the shifting-down time in the rated revolution state and the low-speed revolution state of the engine.

Hereinbelow, a description will be made regarding an embodiment shown in FIGS. 19 to 22, an embodiment shown in FIGS. 23 and 24, and an embodiment shown in FIGS. 25 and 26. In each of the figures, A shows a hydraulic-pressure control graph in the case of speed-changing with one-objective-based hydraulic clutches being disengaged/engaged, and B shows a hydraulic-pressure control graph in the case of speed-changing with two-objective-based hydraulic clutches being disengaged/engaged. In each of the figures, A and B are the same in unit-time intervals on the horizontal axis and unit-pressure intervals on the vertical axis.

Figure 19:
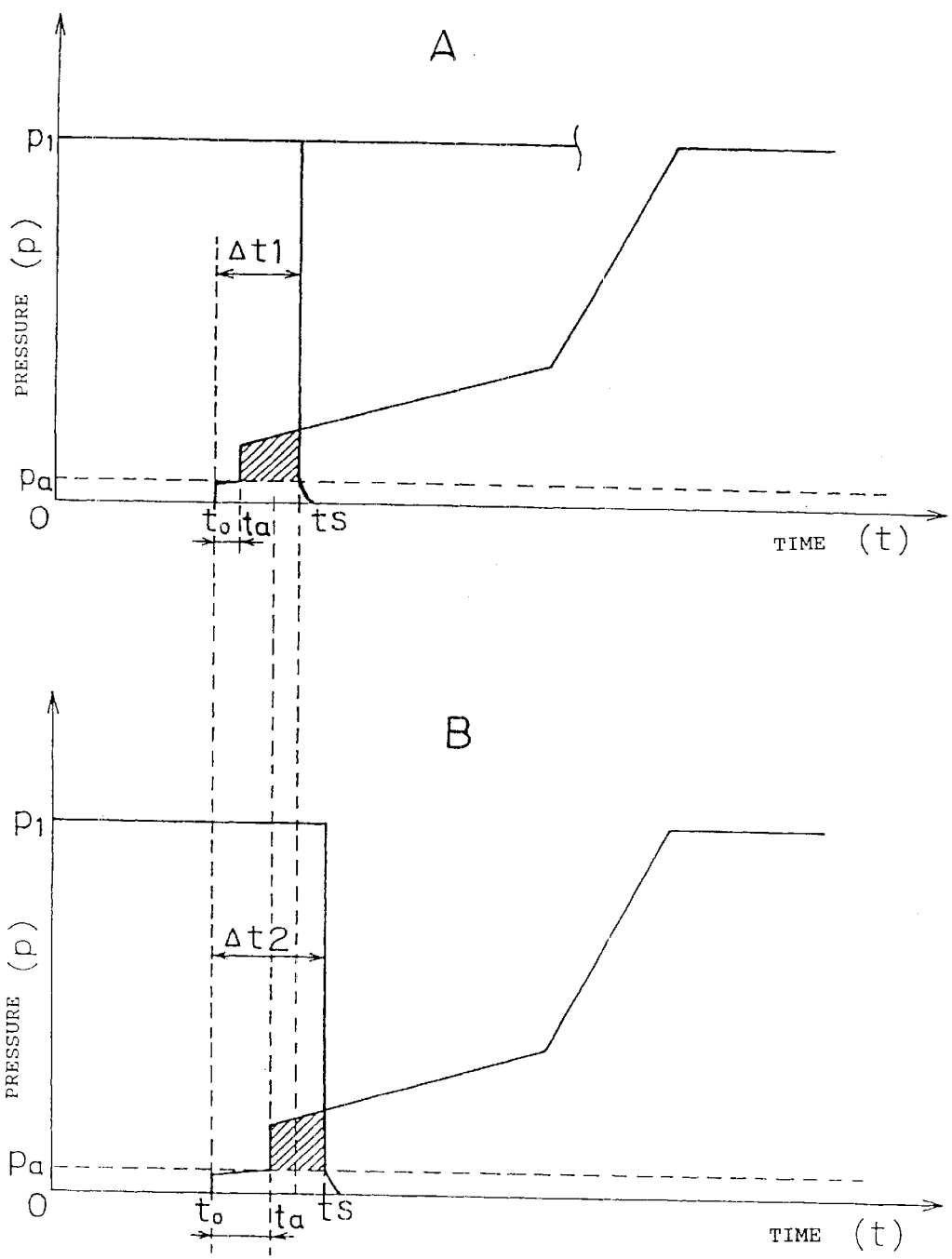
FIG. 19 shows time-transitional graphs regarding hydraulic-clutch-operating pressures at a shifting-up time in a rated-speed engine revolution state.

FIG. 19 shows hydraulic-pressure control states at a shifting-up time in the rated-speed engine revolution state. The tachometer 83 shown in FIG. 3 or 4 inputs a signal representative of the rated revolution state of the engine to the logical circuit 80. The potentiometer 82 inputs to the logical circuit 80 a signal that represents the position of the primary speed change lever 81 before or after a shifting-up operation. The logical circuit 80 determines whether the case requires only one hydraulic clutch to be newly engaged or requires two hydraulic clutches to be newly engaged.

FIG. 19A shows a hydraulic-pressure control state in the case where one-objective-based hydraulic clutches are disengaged/engaged. Therefore, at a disengagement start time ts, while one hydraulic clutch is disengaged to thereby reduce an operating pressure p therefor, another hydraulic clutch remains engaged at an operating pressure p being kept at a normal pa. FIG. 19B shows a control state in the case where two-objective-based hydraulic clutches are disengaged/engaged. Therefore, at the disengagement start time ts, while two hydraulic clutches are disengaged to thereby reduce operating pressures p for the two clutches. In either one of the case of FIG. 19A or the case of FIG. 19B, a solenoid-excitation-relief control pattern for producing the hydraulic-pressure-decrease property graph D1 is selected in the pressure-setting circuit 89, and the operating pressure p for the hydraulic clutch to be disengaged is abruptly reduced to a level equal to or lower than the piston-holding pressure pa.

The arrangement is modified such that engine load states in the cases shown in A and B of FIG. 19 are not different from each other, and the same solenoid-exciting pattern is set in the pressure-setting circuit 87 for the both to implement the same pressure-increase pattern. This arrangement is common to cases shown in FIGS. 20 to 22, which will be described below.

As can be seen through the comparison between FIGS. 19A and 19B, a delay time Δt2 of the disengagement start time ts from an engagement start time $t_0$, (which hereinbelow will be referred to as a "delay time"), which is shown in FIG. 19B, in the case where two-objective-based hydraulic clutches being disengaged/engaged is set longer than a delay time Δt1 in the case where one-objective-based hydraulic clutches are disengaged/engaged corresponding to a time difference from the engagement start time $t_0$ to a pressure-rising time ta. Thereby, the states and the areas of common slip regions shown by slanting lines in A and B are controlled to be substantially the same. Therefore, even when any type of shifting-up is performed, good speed-change feelings that are similar to each other can be obtained.

Figure 20:
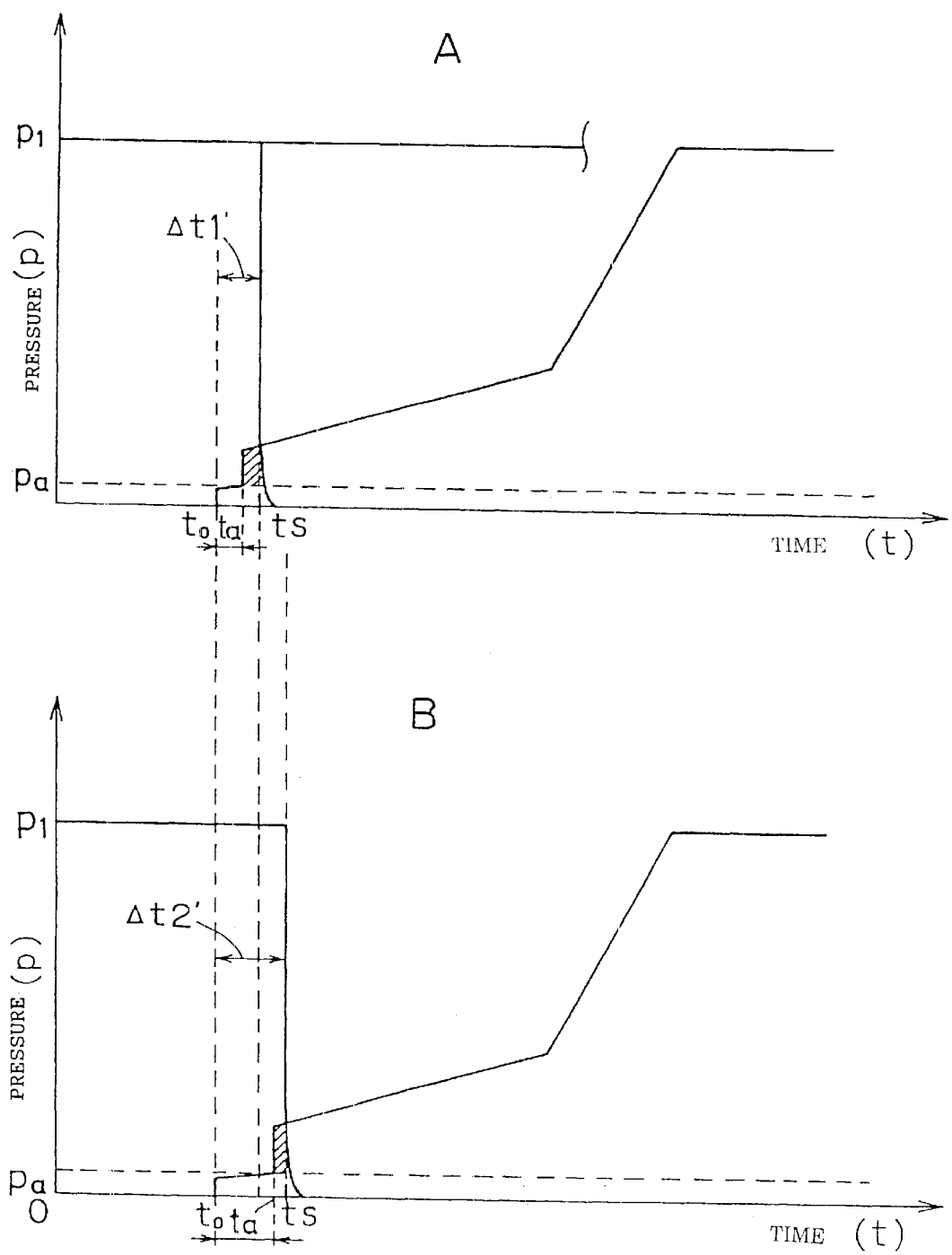
FIG. 20 shows time-transitional graphs regarding hydraulic-clutch-operating pressures at a shift-down time in the rated-speed engine revolution state.

FIG. 20 shows hydraulic-pressure control states at a shift-down time in a rated-engine-revolution condition, in which A shows a case where one-objective-based hydraulic clutches are disengaged/engaged, and B shows a case where two-objective-based hydraulic clutches are disengaged/engaged. Similarly to the cases shown in FIG. 19, in either of the cases shown in A and B, a pressure-decrease pattern is set to D1.

Similarly to the cases in FIG. 19, to obtain substantially the same common slip region in A and B with regard to the state and the area, a delay time Δt2' in B is controlled to be longer than a delay time Δt1' in A, corresponding to the time difference from an engagement start time $t_0$ to a pressure-rising time ta.

However, taking inertia generated at a time of vehicular traveling into account, Δt1' and Δt2' at shifting-down times are controlled to be shorter than Δt1 and Δt2, respectively. Thereby, the common slip region is reduced narrower than that at the shifting-up time shown in FIG. 19 to thereby implement improvement in energy efficiency.

Figure 21:
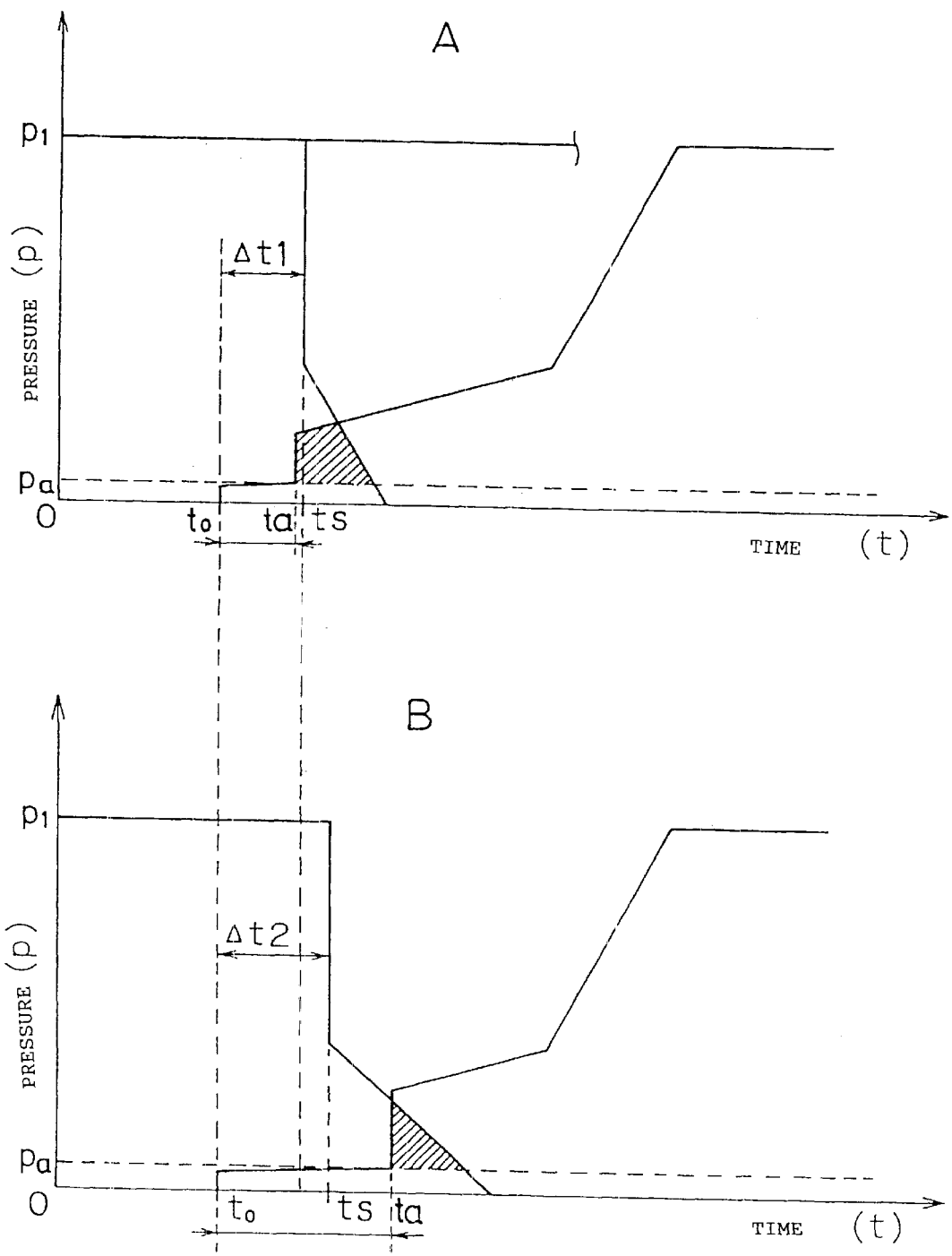
FIG. 21 shows time-transitional graphs regarding hydraulic-clutch-operating pressures at a shifting-up time in a low-speed engine revolution state.

FIG. 21 shows hydraulic-pressure control states at a shifting-up time in a low-speed (idle revolution speed, or a revolution speed similar thereto) engine revolution. Therefore, the tachometer 83 shown in FIG. 3 or 4 inputs a signal representative of the low-speed engine-revolution state to the logical circuit 80. Setting of delay times Δt1 and Δt2 is performed similar to that shown in FIG. 19. However, at the low-speed engine revolution state, the revolution frequency of the hydraulic pump 50 is reduced lower than that at the rated-speed engine revolution time. Therefore, the clutch fluid-chamber-filling-out required period required for rise in a hydraulic pressure p to a pressure equal to or higher than the piston-holding pressure pa, that is, the time from an engagement start time t, to a pressure-rising time ta is longer than that that at each of the rated-speed engine revolution states shown in FIG. 19. Therefore, the delay times Δt1 and Δt2, which have been set taking the fluid-chamber-filling-out required period in the rated-speed engine revolution state into account, are used without modification. Concurrently, similarly to the case shown in FIG. 19, a pressure-decrease property graph is set to D1. In this case, in either A or B, a common slip region is very narrow. That is, since a sufficient area cannot be secured, the speed-change feeling is impaired.

In the case shown in FIG. 21, a solenoid-excitation-relieving pattern is selected in the pressure-setting circuit 89 to slowly reduce an operating pressure for a hydraulic clutch, that is, to implement the hydraulic-pressure-decrease graph D2 or D3. To cause the pressure reduction to be slow as described above, the variable aperture Va in each of the electromagnetic proportion selector valves is used.

According to the pressure control graph in FIG. 21A showing the case of a time of shifting-up carried out in a state where one-objective-based hydraulic clutches are disengaged/engaged, the pressure is abruptly reduced at a disengagement start time. After the pressure is reduced to a specific level of the pressure, the pressure-decrease graph D2 in which the pressure slowly decreases is set. Thereby, the area of a common slip region is controlled to be substantially the same as that shown in FIG. 19.

In addition, according to the pressure control graph in FIG. 21B showing the case of a time of shifting-up carried out in a state where two-objective-based hydraulic clutches are disengaged/engaged, the above-described fluidchamber-filling-out required period is so long that even a disengagement start time ts set according to a delay time $\Delta t2$ set longer than the pressure-rising time ta is earlier than the pressure-rising time ta. Therefore, the hydraulic-pressure-decrease graph D3 in which the pressure is reduced even slower than that in the pressure-decrease graph D2 is selected to obtain a common slip region. In addition, the area of the region is controlled to be substantially the same as that shown in FIG. 19.

Figure 22:
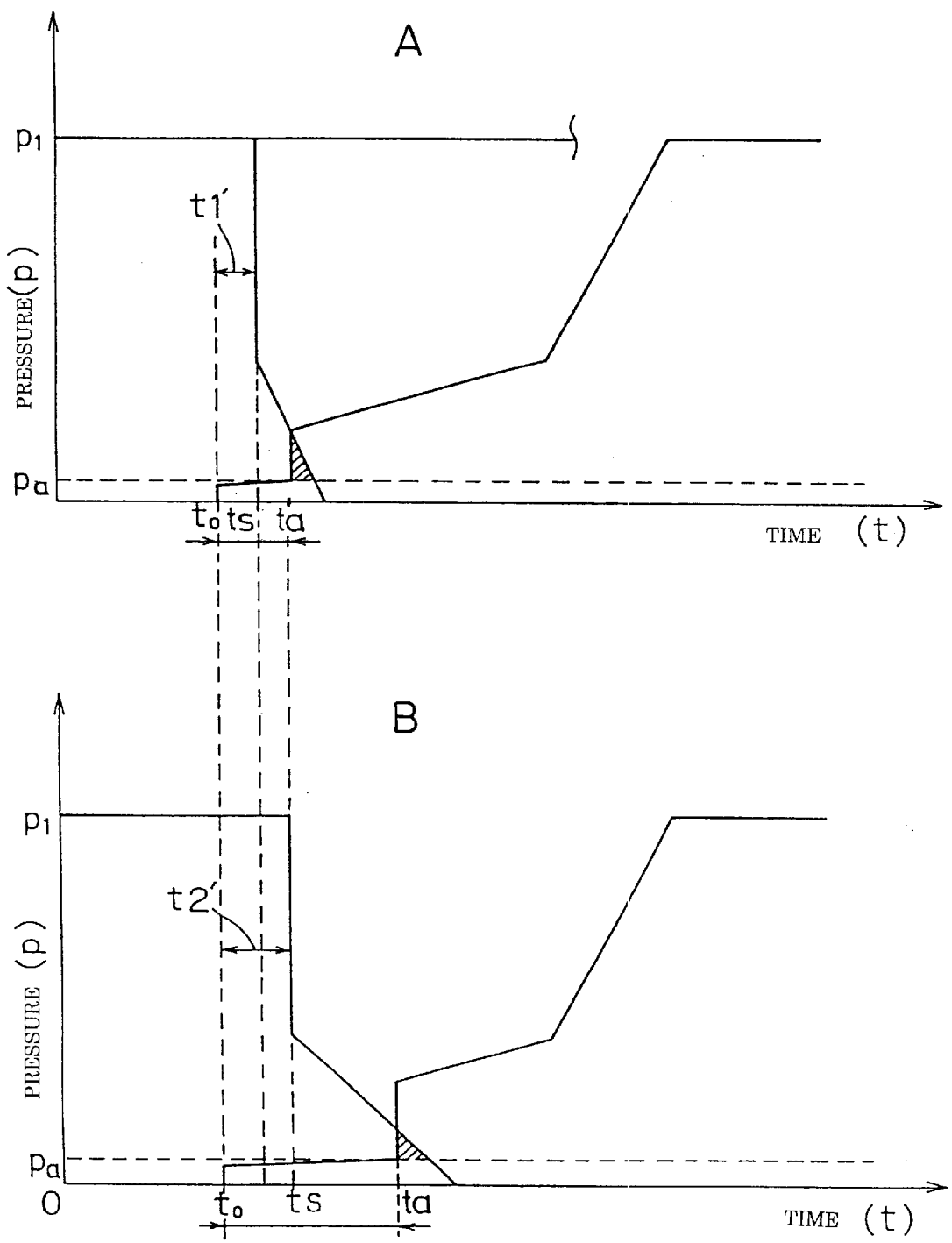
FIG. 22 shows time-transitional graphs regarding hydraulic-clutch-operating pressures at a shift-down time in a low-speed engine revolution state.

FIG. 22 shows hydraulic-pressure control states at a shifting-down time in a low-speed engine revolution. Similarly to the case shown in FIG. 21, the tachometer 83 shown in FIG. 3 or 4 inputs a signal representative of the low-speed engine revolution state to the logical circuit 80. In A and B of FIG. 22, the graphs in A and B of FIG. 21, i.e., the same pressure-decrease patterns as those in the shifting-up times, are set in the pressure-setting circuit 89. In the time-setting circuit 90, similarly to the cases at the times of shifting-down carried out in the rated-speed engine revolution state, which are shown in FIG. 20, to improve the energy efficiency, delay times $\Delta t1'$ and $\Delta t2'$ that are respectively shorter than the delay times $\Delta t1$ and $\Delta t2$ at the shifting-up time are set. In this way, common slip regions having substantially the same areas of the common slip regions shown in FIGS. 20A and 20B are secured to thereby allow good speed-change feeling to be obtained.

The present embodiment has a method to obtain a constant common slip region regardless of the time difference in the fluid-chamber-filling-out required periods of an engagement-objective clutch between the rated-speed engine revolution state and the low-speed engine revolution state. As can be seen through the comparison between FIGS. 19A and 21A, between FIGS. 19B and 21B, between FIGS. 20A and 22A, or between FIGS. 20B and 22B, to achieve the aforementioned method, the embodiment modifies the pressure-decrease property for the disengagement-objective clutch. As an alternative method, it is conceivable that the delay time, i.e., the time between the engagement start time $t_0$ and the disengagement start time, is modified. In addition, it is conceivable that both the pressure-decrease property and delay time are modified.

Hereinbelow, the hydraulic-pressure control illustrated in FIGS. 23 and 24 will be described. The hydraulic-pressure control shown in FIGS. 19 to 22 controls the delay time to be different in the case where one-objective-based hydraulic clutches are disengaged/engaged and the case where two-objective-based hydraulic clutches are disengaged/engaged. That is, in the latter case, the delay time is set to the delay time $\Delta t2$ or $\Delta t2'$. Hydraulic-pressure control shown in FIG. 23 or 24, however, uses delay time $\Delta t1$ or $\Delta t1$ set either in the case of the speed-changing with one-objective-based hydraulic clutches being disengaged/engaged or in the case of the speed-changing with two-objective-based hydraulic clutches being disengaged/engaged. Thereby, instead of controlling the delay time to be different, the hydraulic-pressure control controls the pressure-decrease pattern to be different in the individual cases.

Figure 23:
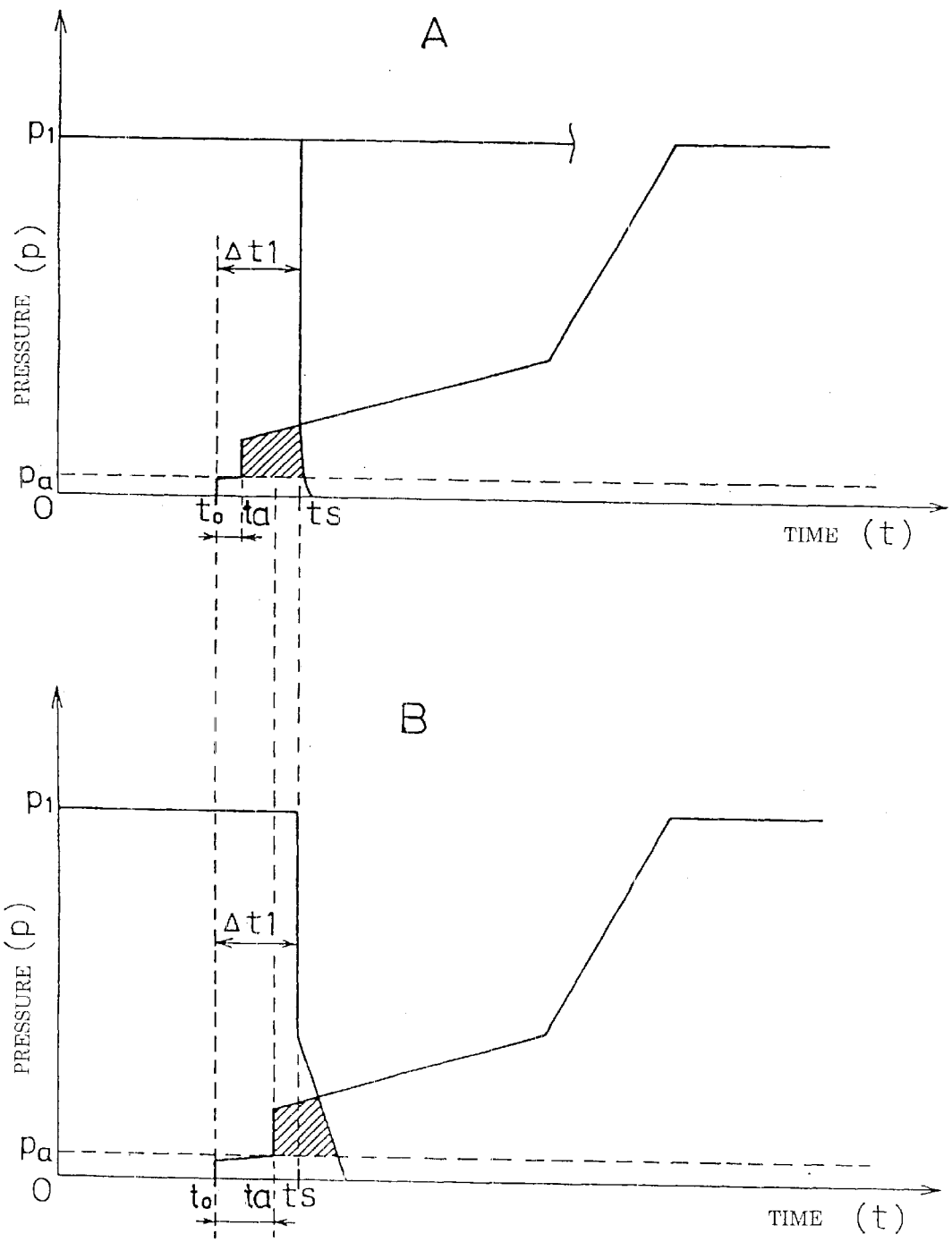
FIG. 23 shows time-transitional graphs regarding hydraulic-clutch-operating pressures at a shifting-up time in the rated-speed engine revolution state in a case where a delay time is not changed depending whether one or two disengagement/engagement clutches are operated.

FIG. 23 shows cases of shifting-up carried out in the rated-speed engine revolution state. The delay time from an engagement start time $t_0$ to a disengagement start time ts is set to $\Delta t1$ in either the case where one-objective-based hydraulic clutches are disengaged/engaged or the case where two-objective-based hydraulic clutches are disengaged/engaged. In each of the cases, a solenoid-excitation-relieving pattern suitable to the above arrangement is selected in the pressure-setting circuit 89. Thereby, as shown in FIG. 23A, in the former case, control as represented by the hydraulic-pressure-decrease property graph D1 as in the case of FIG. 19A can be implemented; and as shown in 23B, in the latter case, control as represented by the pressure-decrease graph D2 including the portion where the pressure is slowly reduced can be implemented. Since the delay time is set to $\Delta t1$, when two-objective-based hydraulic clutches are disengaged/engaged, compared to the case where one-objective-based hydraulic clutches are disengaged/engaged, a fluid-chamber-filling-out period ($t_0$ to ta) is increased to be relatively long, and the time between the hydraulic-pressure-rising time ta and the disengagement start time ts is reduced relatively short. However, the pressure is instead slowly reduced, thereby controlling the areas of the common slip regions in the cases of A and B to be substantially the same.

Figure 24:
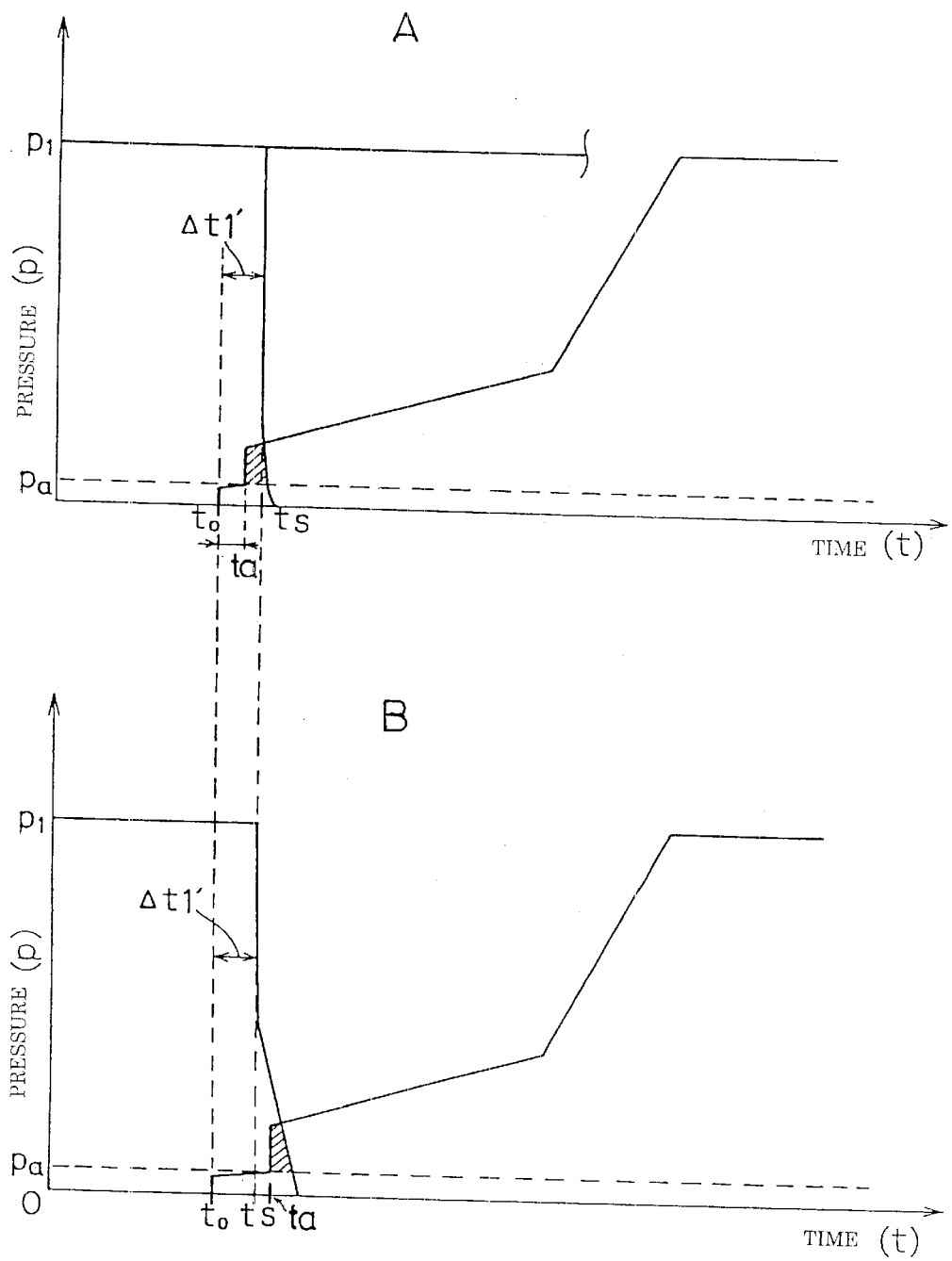
FIG. 24 shows time-transitional graphs, which are similar to the above, regarding hydraulic-clutch-operating pressures at a shift-down time.

FIG. 24 shows cases of shifting-down carried out in the rated-speed engine revolution state. The delay time is set to $\Delta t1'$, which is shorter than $\Delta t1$, in either one of the case where one-objective-based hydraulic clutches are disengaged/engaged or where two-objective-based hydraulic clutches are disengaged/engaged. In each of the cases, a solenoid-excitation-relieving pattern suitable to this arrangement is selected in the pressure-setting circuit 89. Thereby, as shown in FIG. 24A, in the former case, -control as represented by the hydraulic-pressure-decrease property graph D1 as in the case of FIG. 20A (23A) can be implemented; and as shown in 24B, in the latter case, control as represented by the pressure-decrease graph D2 including the portion where the pressure is slowly reduced can be implemented as in the case of FIG. 23B. Thereby, the common slip regions shown in FIGS. 24A and 24B, which improves the energy efficiency, are controlled narrower than the common slip regions shown in FIGS. 23A and 23B. However, the areas of the common slip regions in the two cases are controlled to be substantially the same, as shown in FIGS. 24A and 24B.

The embodiment shown in FIGS. 23A and 23B discloses the control in the rated-speed engine revolution state. However, control similar thereto can be implemented even in the low-speed engine revolution state. In this case, the delay time is controlled to be same in either, one of the cases where one-objective-based hydraulic clutches are disengaged/engaged or where two-objective-based hydraulic clutches are disengaged/engaged. In addition, the pressure-decrease pattern is set to allow the provision of common slip regions having the same areas as the common slip regions that can be obtained in the rated speed engine revolution state. However, for example, at a shifting-up time when two-objective-based hydraulic clutches are disengaged/engaged, as shown in FIG. 22B, the fluid-chamber-filling-out period (t, to ta) is so long that the common slip regions may not be obtained with the delay time $\Delta t1'$ being set. In this case, to allow the implementation of control as represented by a pressure-decrease graph including a pressure-decrease slanting portion further gentler than D3 shown in FIG. 22B, it is conceivable that a solenoid-excitation-relieving pattern corresponding thereto is stored in the pressure-setting circuit 89 or that the delay time is set longer than $\Delta t1'$ (for example, it is set to $\Delta t2'$) only for the particular case.

Figure 25:
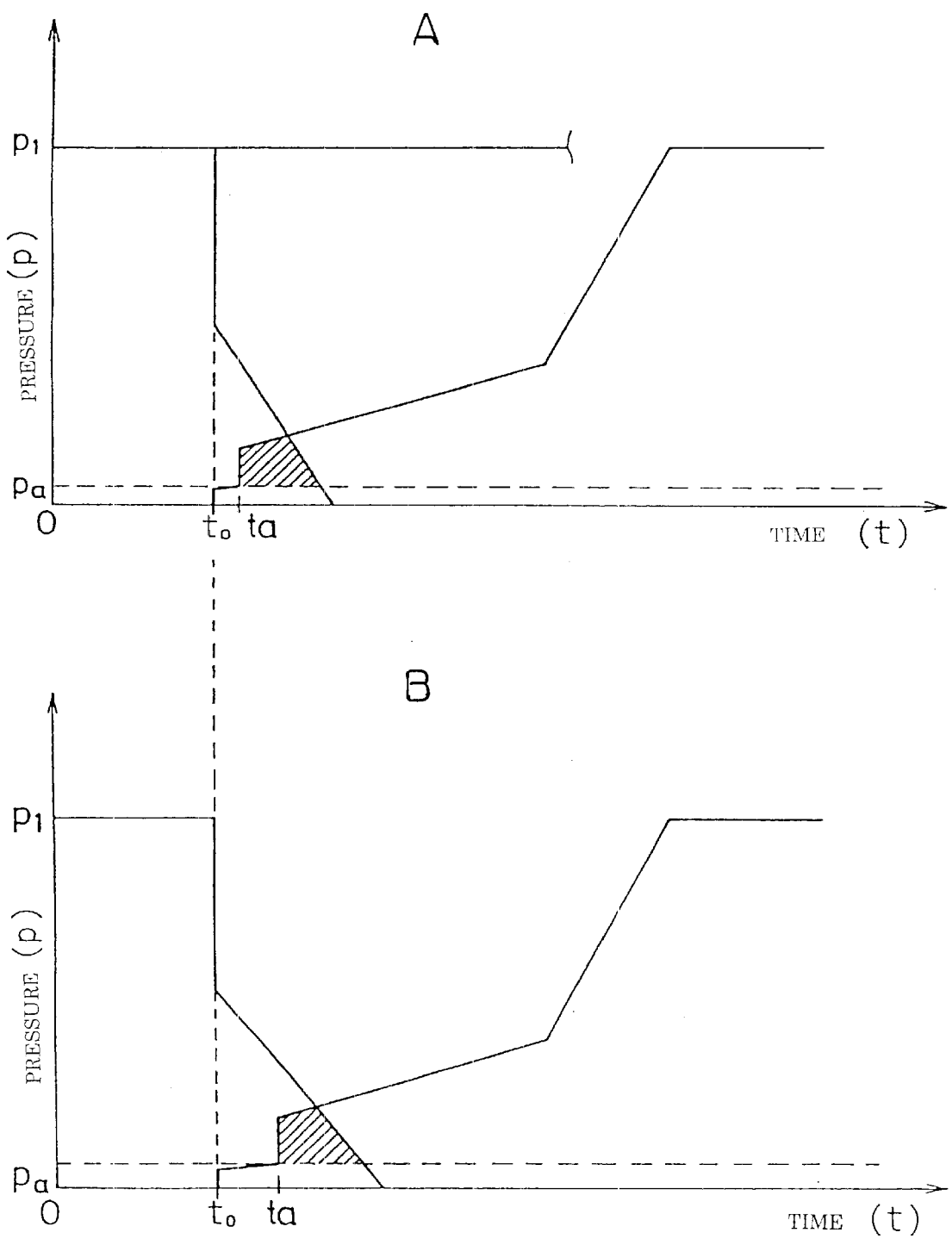
FIG. 25 shows time-transitional graphs regarding hydraulic-clutch-operating pressures at a shifting-up time in the rated-speed engine revolution state in a case where a hydraulic-pressure-increase start time of an engagement-objective clutch is controlled to match a hydraulic-reduction start time of a disengagement-objective clutch.

FIG. 25 shows an embodiment of control at a time of shifting-up carried out in the rated-speed engine revolution state without a delay time being provided. Specifically, a disengagement start time ts is controlled to match an engagement start time $t_0$. Because of this arrangement, a solenoid-excitation-relieving pattern suitable to this arrangement is selected in the pressure-setting circuit 89. Thereby, in the case shown in A, control that can be represented by a pressure-decrease graph (such as D2) including a portion representing a slow reduction in the pressure is implemented; and in the case shown in B, taking the fluid-chamber filling-out time is longer than that in the case of A into account, control that can be represented by a pressure-decrease graph (such as D3) including a portion representing an even-slower reduction in the pressure is implemented. According to the above, although no delay time is provided, common slip regions having substantially the same areas as those in the cases shown in FIGS. 19A and 19B can still be secured.

FIGS. 26A and 26B show cases at a time of shifting-up carried out in the rated-speed engine revolution state, in which delay times are individually set shorter than the delay times Δt1 and Δt2 set in the cases shown in FIGS. 19A and 19B. In each of the cases, a solenoid-excitation-relieving pattern suitable to this arrangement is selected in the pressure-setting circuit 89. Thereby, in the case shown in A, control that can be represented by a pressure-decrease graph (such as D2) including a portion representing a slow reduction in the pressure is implemented; and in the case shown in B, taking the fluid-chamber filling-out time is longer than that in the case of A into account, control that can be represented by a pressure-decrease graph (such as D3) including a portion representing an even-slower reduction in the pressure can be implemented. Thus, the delay time is reduced, and concurrently, a pressure-decrease property is appropriately set. Thereby, common slip regions having substantially the same areas as those in the cases shown in FIGS. 19A and 19B can be secured, and good operational feeling can be obtained.

Figure 26:
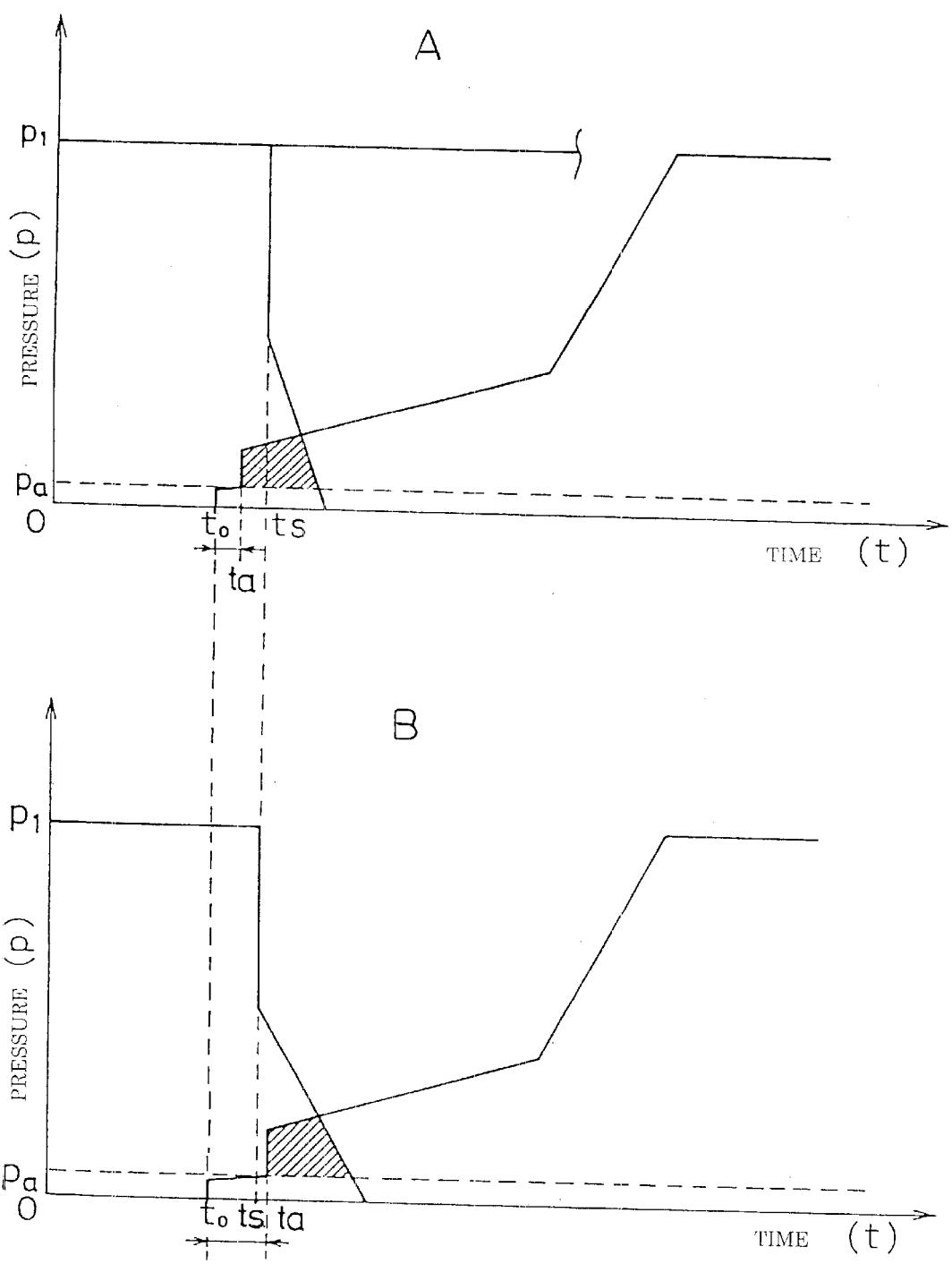
FIG. 26 shows time-transitional graphs regarding hydraulic-clutch-operating pressures at a shifting-up time in the rated-speed engine revolution state in a case where a delay time set between the pressure-reduction start time of the disengagement-objective clutch and the pressure objective start of the engagement-objective clutch is controlled shorter than the delay time set in the case shown in FIG. 19.

Although the embodiments of the control shown in FIG. 25 or 26 do not disclose a case other than that at the time of shifting-up carried out in the rated-speed engine revolution state, each of them may also be applied to the case at a time of either shifting-up or shifting-down in a low-speed engine revolution state. In this case, the arrangement may be made such that, while a delay time is not provided, or a delay time is reduced, pressure-decrease properties (pressure-decrease graphs) are appropriately set to allow common slip region to be secured. Alternatively, the hydraulic-pressure control methods shown in FIGS. 19 to 26 may be combined corresponding to various cases. For example, the method may be arranged such that no delay time is provided at the time of shifting-up in the rated-speed engine revolution state; or a short delay time is provided at the time of shifting-down in the rated-speed engine revolution state.

In addition, the control method may be arranged such that, as in the case of each of the individual embodiments shown in FIGS. 19 to 22, revolution states of the engine are classified into the rated-speed revolution state and the low-speed revolution state to vary hydraulic-pressure-decrease properties for hydraulic clutches. Alternatively, the control method may be arranged such that the engine revolution states are not classified, but the slant degree of the hydraulic-pressure-decrease graph as shown in FIG. 11 can be varied continuously so as to correspond to the revolution frequencies of the engine 10, that is, so as to be less in proportion to the reduction in the revolution frequency. For example, the method may be arranged such that a detection value obtained by the tachometer 83 is compared to the rated engine revolution frequency, and the aperture of the variable aperture Va can be controlled corresponding to the comparison result so that control which can be represented by a pressure-decrease graph of which the slant degrees are less in proportion to the reduction in the engine revolution frequency can be implemented in the pressure-setting circuit 89. According to this arrangement, a fluid-filling-out time for a hydraulic clutch, which is required to be longer in proportion to the reduction in the engine revolution frequency, can be continuously compensated for corresponding to the engine revolution frequency, and a common slip region can be secured in the hydraulic-pressure control graph, thereby allowing good speed-change operation can obtained at all times.

Hereinbelow, a description will be made regarding detection of an abnormal hydraulic clutch, the detection being performed using the pressure sensor provided between each of the electromagnetic proportion selector valves and hydraulic clutch corresponding thereto, and regarding hydraulic-pressure control according to the detection. A pressure-increase property for an engagement-objective clutch, a pressure-decrease property for a disengagement-objective clutch, and starting times of the engagement and disengagement courses are specifically set corresponding to required conditions. This allows the prediction to be made for time when a pressure-sensor-detecting value of hydraulic pressure for a disengagement-objective clutch begins to decrease up to a pressure value corresponding to tolerable absorption energy value of a lining of a friction disc of the hydraulic clutch (switch-shifting pressure pb shown in the above-described figures such as FIGS. 17 and 18). Therefore, time is set through the prediction of the pressure-decrease time. When the pressure sensors indicates a level higher than the aforementioned pressure value (switch-shifting pressure pb) even after the set time has passed, the logical circuit 80 receives an input signal therefrom and thereby determines that the disengagement-objective clutch is abnormal because of, for example, entrance of foreign substances.

As shown in the figures such as FIGS. 17 and 18, each of the pressure sensors is configured to function as a switch that turns ON when pressure is higher than the switch-shifting pressure pb. In this case, when one of the pressure sensors for a disengagement-objective clutch still remains in the ON state even after the above-described set time has passed, it determines the clutch to be abnormal.

For the pressure sensor for the disengagement-objective clutch to perform the abnormality detection, it needs to identify a disengagement-objective clutch that is variable according to various types of speed changes. Therefore, control therefor is complicated. In each of the first hydraulic type speed change unit 17 (17') and the second hydraulic type speed change unit 20, a disengagement-objective clutch is supposed to be alternatively selected at a speed-change time. Therefore, in each of the hydraulic type speed change units, when two or more pressure sensors are in a state higher than the switch-shifting pressure pb (or, they are turned ON), determination can be made that the hydraulic type speed change unit includes an abnormal hydraulic clutch. Specifically, according to a calculation performed for the number of pressure sensors that have detected hydraulic pressures higher than the switch-shifting pressure pb after the above-described set time has passed at a speed-change time in each of the individual hydraulic type speed change units, determination can be made whether the hydraulic type speed change unit is normal or abnormal without performing identification of disengagement-objective clutches. This method may be employed as an abnormality-determining method.

As described above, when an abnormal clutch is detected, engagement commands for the solenoids for all the electromagnetic proportion selector valves are reset by the logical circuit 80 and the solenoid-driver circuits 85 and 86. That is, even hydraulic clutches commanded to engage are disengaged. The unit is thus controlled to be in a state where at most only a hydraulic clutch that cannot be disengaged because of a foreign substance intruded into the fluid chamber thereof is filled with operating fluid at a pressure higher than the switch-shifting pressure. Thereby, abnormal double engagement in a gear train is prevented.

Alternatively, it is conceivable to increase an operating pressure p that is applied to a hydraulic clutch which is to be connected to an pressure sensor issuing an ON signal positively at the earliest time, that is, a hydraulic clutch engaged before shifting and included a foreign substance in itself to the normal pressure $P_1$. In this way, the aforementioned hydraulic clutch is controlled to be in a completely-press-contacted state. Thereby, at least the foreign substance included in the fluid chamber of the hydraulic clutch is not sandwiched by the clutch in its engagement, and is kept in a state of floating in the fluid, thereby allowing the hydraulic clutch to be prevented from damage.

In any one of the hydraulic-pressure control methods, it is preferable that the existence of an abnormal clutch is notified to an operator as a result of the abnormal-clutch detection in a way of, for example, lighting a warning lamp.

FIG. 27 shows a flowchart for control according to an embodiment. The control is implemented for an instance in which a foreign substance is carried into a hydraulic clutch. In the control, the pressure sensor is assumed to have a function as a switch that turns ON in response to the detection of a hydraulic pressure higher than the switch-shifting pressure pb. First, in step 401, processing determines whether or not the engine 10 is in operation. If the engine 10 is in operation, processing proceeds to step 402. In step 402, if, in three pressure sensors in the first hydraulic type speed change unit 17 or in two pressure sensors in the first hydraulic type speed change unit 171, two or more pieces thereof are turned ON, processing proceeds to step 403. In step 403, in order to increase the pressure for a hydraulic clutch corresponding to a pressure sensor that has been in an ON state before the primary speed change lever 81 was shifted, a solenoid for an electromagnetic proportion selector valve is excited, and other solenoids are relieved from excitation to control the hydraulic clutches other than the aforementioned hydraulic clutch to disengage. In short, the state of the first hydraulic type speed change unit 17 (17') is returned to the pre-shift state. Alternatively, the processing in the step may be modified such that solenoids for all the electromagnetic proportion selector valves in the first hydraulic type speed change unit 17 (17') are relieved from excitation. Subsequently, in step 404, a warning means (a lamp or a buzzer) for notifying abnormality caused in the first hydraulic type speed change unit 17 (17') is operated.

Subsequently, at step 405, in the three pressure sensors in the second hydraulic type speed change unit 20, when two or more pieces thereof are turned ON, the control in steps 403 and 404 is performed. Also in the second hydraulic type speed change unit 20, if two or more pressure sensors are not turned ON, processing determines the state thereof to be free of abnormality that disables the engagement of a hydraulic clutch, allows an engagement-objective hydraulic clutch to engage, and allows a disengagement-objective hydraulic clutch to disengage (step 406).

Figure 28:
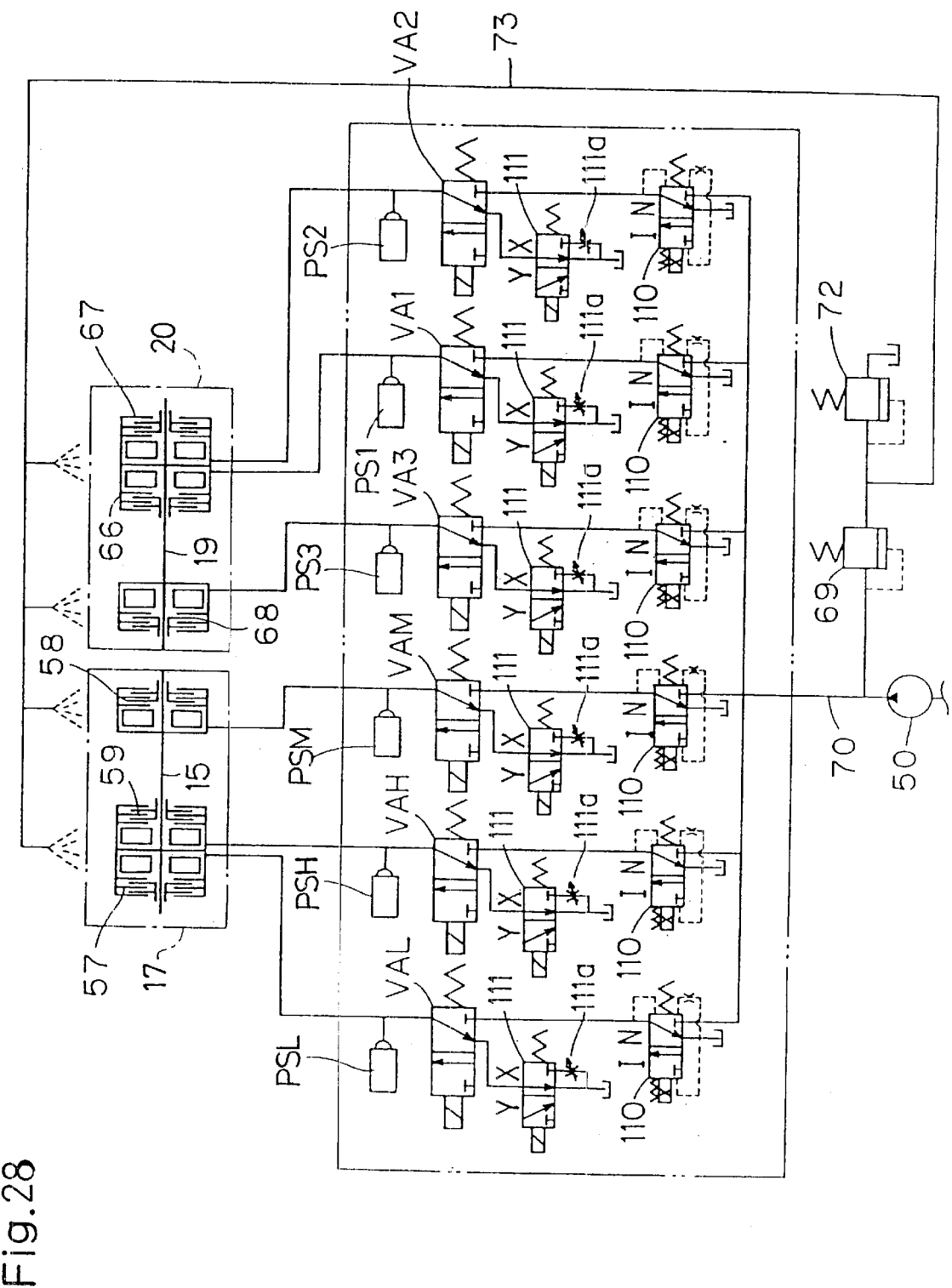
FIG. 28 shows diagram of other hydraulic circuits in the primary speed change mechanism 1.

The above almost completes intended description regarding the hydraulic-clutch hydraulic-pressure control of the present invention. Hereinbelow, a description will be made regarding an embodiment of a hydraulic circuit shown in FIG. 28, which is configured by modifying the hydraulic circuit shown in FIG. 2 to be more primitive. The above-described electromagnetic proportion selector valves VL, VM, VH, V1, V2, and V3 are replaced by electromagnetic selector valves VAL, VAM, VAH, VA1, VA2, and VA3, respectively. The fluid-feeder circuit 70 is connected to these electromagnetic selector valves individually via electromagnetic proportion valves 110. A tank port of each of the electromagnetic selector valves is connected to an electromagnetic controller valve 111. Each of the electromagnetic controller valves 111 is equipped with a variable aperture 111a. In FIG. 28, the variable aperture 111a is shown outside of the electromagnetic controller valve 111 to be easily viewed. The variable apertures 111a are provided instead of the variable apertures Va shown in FIG. 2.

Each of the electromagnetic proportion valves 110 is set to a neutral position N with a corresponding solenoid being set to a nonexcitation state while it is set to an operating position I with a corresponding solenoid excited. To cause a hydraulic clutch to be disengaged, the electromagnetic proportion valve 110 corresponding thereto is set the neutral position N, thereby discontinuing the connection between the electromagnetic selector valve, which is connected to the clutch, and the fluid-feeder circuit 70. Concurrently, a solenoid for the electromagnetic selector valve is relieved from the excitation, and is set to a fluid tank via the corresponding electromagnetic controller valve 111. At this time, with the electromagnetic controller valve 111 being set to an X position, fluid fed from the electromagnetic controller valve 111 is returned to the fluid tank without the variable aperture 111a being used therebetween. Therefore, there is implemented the vertically-linear hydraulic-clutch pressure reduction at the disengagement start time ts, which is shown in FIG. 11. With the electromagnetic controller valve 111 being set to a Y position, operating fluid is gradually returned to the fluid tank via the variable aperture 111a, thereby slowly reducing the hydraulic-pressure pressure. Therefore, to perform control as represented by the hydraulic-pressure-decrease property graph D1 shown in FIG. 11, when each of the electromagnetic proportion valves 110 and the electromagnetic proportion valves is set to a fluid-returning position (neutral position N), the electromagnetic controller valve 111 is set to the X position throughout the entire reduction course through which the pressure p in the fluid chamber of the disengagement-objective clutch is reduced substantially to 0. Similarly, to perform control as represented by either the pressure-decrease graph D2 or D3, when each of the electromagnetic proportion valves 110 and the electromagnetic proportion valves is similarly set to a fluid-returning position (neutral position N), the electromagnetic controller valve 111 is first set to the X position to abruptly reduce the pressure p in the fluid chamber of the disengagement-objective clutch, the electromagnetic controller valve 111 is then switched to be set to the Y position to thereby slowly reduce the operating pressure p. In addition, the aperture of the variable aperture 111a is adjusted to select one of the control patterns represented by D2 and D3.

To engage a hydraulic clutch, the solenoid for the corresponding electromagnetic proportion valve 110 is excited to be set to a position I, and a solenoid for an electromagnetic selector valve to be connected thereto is also excited to control the unit to be in a state where fluid is fed from the fluid-feeder circuit 70 to the intended hydraulic clutch. In this state, the electromagnetic proportion valve 110 is controlled to reduce the aperture for the fluid that is fed from the fluid-feeder circuit 70 to the electromagnetic selector valve, thereby increasing the operating pressure p that is applied to the engagement-objective clutch.

The hydraulic-circuit configuration shown in FIG. 28 can also be combined with the electrical controller circuit shown in FIG. 3 or 4 to be used for the hydraulic-pressure control as illustrated in FIGS. 17 to 27.

INDUSTRIAL APPLICABILITY

As described above, the present invention functions in the speed change mechanism having the hydraulic clutches; particularly, it functions in the speed change mechanism configured of the plurality of hydraulic type speed change units connected in tandem, the hydraulic type speed change unit having the plurality of hydraulic clutches that are alternatively engaged. The invention enables smooth, secure, and comfortable speed-changing to be implemented at all times regardless of the engine revolution frequency and the speed-step shift condition. In addition, the invention allows double transmission to be effectively avoided at the time of abnormality, such as the entrance of a foreign substance in the hydraulic clutch during the speed-changing. Therefore, the invention provides significant advantages for vehicles that employ the invention, such as agricultural tractors and other work tractors that require many speed-change steps.

What is claimed is:

1. A method of performing hydraulic-pressure control in a speed change mechanism comprising a plurality of speed-changing hydraulic clutches, each of which is engaged according to hydraulic-pressure-increase effects and is disengaged according to hydraulic-pressure-decrease effects, wherein a piston of each of the clutches remains neutral regardless of the quantity of supplied hydraulic oil when a hydraulic pressure therein is less than a piston-holding pressure, and is operated at a stroke corresponding to the quantity of supplied hydraulic oil when the hydraulic pressure therein is not less than the piston-holding pressure, wherein while each of the clutches that has been disengaged is engaged by supplying hydraulic oil, the hydraulic pressure therein that has been less than the piston-holding pressure is gradually increased to a normal engaging-pressure above the piston-holding pressure, wherein the speed of increasing hydraulic pressure for engaging the clutch is increased correspondingly to the increase of an engine revolution frequency, and wherein, during a speed-changing operation such as to disengage one of the clutches from an engaged state and to engage another from a disengaged state, at least either a time difference between an operating-hydraulic-pressure-decrease start time for a disengagement-objective clutch and an operating-hydraulic-pressure-increase start time for a engagement-objective clutch or a time-transitional decrease property of hydraulic pressure in the disengagement-objective clutch is controlled to vary correspondingly to variations in the engine revolution frequency so that a time-transitional pressure region where the hydraulic pressures in both the engagement-objective clutch and the disengagement-objective clutch are equal to or more than the piston-holding pressure is maintained to be constant regardless of variations in the increase-speed of hydraulic pressure in the engagement-objective clutch caused by the variations in the engine revolution frequency.

2. The method of performing hydraulic-pressure control according to claim 1, wherein said hydraulic-pressure control is performed according to control of an electromagnetic pressure proportion valve provided for each of the plurality of speed-changing hydraulic clutches.

3. The method of performing hydraulic-pressure control according to claim 1, wherein, when the time difference is controlled to vary, the time difference is set longer in proportion to reduction in the engine revolution frequency or in a case where the engine revolution frequency is equal to or lower than a specific level.

4. The method of performing hydraulic-pressure control according to claim 1, wherein, when the time-transitional decrease property is controlled to vary, the time-transitional decrease property is set to decrease slower in proportion to reduction in the engine revolution frequency or in a case where the engine revolution frequency is equal to or lower than a specific level.

5. The method of performing hydraulic-pressure control according to claim 1, wherein the time difference is controlled to vary so that, during speed-changing, the operating-hydraulic-pressure in the disengagement-objective clutch starts decreasing after the piston-holding pressure arises in the engagement-objective clutch by filling fluid in a fluid chamber of the engagement-objective clutch.

6. The method of performing hydraulic-pressure control according to claim 1, wherein, regardless of variations in the engine revolution frequency, the time-transitional pressure region where the engagement-objective clutch and the disengagement-objective clutch commonly slip at the time of speed-changing operation is maintained substantially to be constant according to the variations in the time difference and the time-transitional decrease property.

7. The method of performing hydraulic-pressure control according to claim 1, wherein, at the time of speed-changing operation, at least either the time difference between the operating-hydraulic-pressure-increase start time for the engagement-objective clutch and the operating-hydraulic-pressure-decrease start time for the disengagement-objective clutch or the time-transitional decrease property in the operating pressure for the disengagement-objective clutch is controlled to vary depending on whether the speed-changing operation is a shifting-up operation or a shifting-down operation so that, when the speed-changing operation is the shifting-down operation, the time-transitional pressure region where the engagement-objective clutch and the disengagement-objective clutch commonly slip is reduced narrower than that in the case of the shifting-up operation.

8. The method of performing hydraulic-pressure control according to claim 7, wherein, when the time difference is controlled to vary, the time difference at the time of the shifting-down operation is set shorter than the time difference at the time of the shifting-up operation.

9. The method of performing hydraulic-pressure control according to claim 8, wherein the time difference is controlled to vary so that, whether the speed-changing operation may be the shifting-up operation or the shifting-down operation, the operating-hydraulic-pressure in the disengagement-objective clutch starts decreasing after the piston-holding pressure arises in the engagement-objective clutch by filling fluid in a fluid chamber of the engagement-objective clutch.

10. The method of performing hydraulic-pressure control according to claim 7, wherein, if the operating-hydraulic-pressure in the disengagement-objective clutch starts decreasing before the piston-holding pressure arises in the engagement-objective clutch by filling fluid in a fluid chamber of the engagement-objective clutch, the time-transitional decrease property is varied to be gradual so that the time-transitional pressure region where the engagement-objective clutch and the disengagement-objective clutch commonly slip is maintained.

11. The method of performing hydraulic-pressure control according to claim 1, wherein tractional-load detecting means is provided in a vehicle employing the speed change mechanism, and wherein said method modifies at least either a time-transitional increase property in the operating pressure for the hydraulic clutch to be engaged at the time of speed-changing or the time-transitional decrease property in the operating pressure for the hydraulic clutch to be disengaged at the time of speed-changing depending on whether or not said tractional-load detecting means detects a tractional load.

12. The method of performing hydraulic-pressure control according to claim 1, wherein a governor mechanism capable of performing control of an engine revolution frequency according to detection of an engine load is provided in a vehicle employing said speed change mechanism, and wherein said method modifies at least either a time-transitional increase property in the operating pressure for the hydraulic clutch to be engaged at the time of speed-changing or the time-transitional decrease property in the operating pressure for the hydraulic clutch to be disengaged at the time of speed-changing depending on whether or not said governor mechanism detects an engine load equal to or higher than a specific level.

13. The method of performing hydraulic-pressure control according to claim 1, wherein the plurality of hydraulic clutches are classified and allocated in a plurality of hydraulic type speed change units connected in tandem, and the hydraulic clutches are alternatively engaged in each of said hydraulic type speed change units to thereby form one speed-change step.

14. The method of performing hydraulic-pressure control according to claim 13, wherein pressure-detecting means is provided to detect an operating hydraulic pressure for each of the hydraulic clutches, and when two or more units of said pressure-detecting means detects a hydraulic pressure higher than a specific pressure value in one of said plurality of hydraulic type speed change units, one of two hydraulic-pressure control steps is performed, one hydraulic-pressure control step being performed to engage only those of the hydraulic clutches which have immediate-previously been disengaged, and the other one hydraulic-pressure control step being performed to disengage all the hydraulic clutches.

15. The method of performing hydraulic-pressure control according to claim 14, switches being provided as said pressure-detecting means, wherein each of said switches turns ON or OFF with respect to the border of the specific pressure value to thereby determine whether the operating hydraulic pressure of corresponding one of the hydraulic clutches is higher or lower than the specific value.

* * * * *